US010635751B1

(12) United States Patent
Relangi et al.

(10) Patent No.: US 10,635,751 B1
(45) Date of Patent: Apr. 28, 2020

(54) TRAINING SYSTEMS FOR PSEUDO LABELING NATURAL LANGUAGE

(71) Applicant: Capital One Services, LLC, McLean, VA (US)

(72) Inventors: Aditya Relangi, Irving, TX (US); Michael Langford, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/421,026

(22) Filed: May 23, 2019

(51) Int. Cl.
G06F 17/27       (2006.01)
G06N 20/00       (2019.01)
G06F 3/0481      (2013.01)

(52) U.S. Cl.
CPC .......... *G06F 17/278* (2013.01); *G06N 20/00* (2019.01); *G06F 3/0481* (2013.01)

(58) Field of Classification Search
CPC .......... G06F 17/278; G06F 17/279; G06F 16/90332; G06F 16/243; G06F 16/30; G06F 16/9535; G06F 17/21; G06F 17/27; G06F 17/2705; G06F 17/277; G06F 9/542; G06F 17/2785; G06F 16/248; G06F 21/6245; G06F 17/2715; G06F 17/2836; G06F 3/0481; G10L 13/027; G10L 13/043; G10L 15/22; G10L 15/265; G10L 2015/223; G06K 9/00456; G06K 9/00463; G06K 9/4638; G06K 9/6256; G06K 9/6269; G06N 20/00
See application file for complete search history.

(56) References Cited

U.S. PATENT DOCUMENTS

| | | | |
|---|---|---|---|
| 5,963,940 A | 10/1999 | Liddy et al. | |
| 7,548,847 B2 | 6/2009 | Acero et al. | |
| 9,082,403 B2 | 7/2015 | Ju et al. | |
| 9,190,055 B1 | 11/2015 | Kiss et al. | |
| 9,536,522 B1 | 1/2017 | Hall et al. | |
| 10,095,692 B2* | 10/2018 | Song | G06F 17/2881 |
| 10,229,680 B1* | 3/2019 | Gillespie | G10L 15/22 |
| 10,303,771 B1* | 5/2019 | Jezewski | G06N 20/00 |
| 10,395,652 B2* | 8/2019 | Chen | G06F 21/6263 |
| 10,395,654 B2* | 8/2019 | Golipour | G10L 15/22 |
| 10,417,344 B2* | 9/2019 | Futrell | G06F 17/2211 |
| 2005/0027664 A1 | 2/2005 | Johnson et al. | |
| 2008/0052262 A1 | 2/2008 | Kosinov et al. | |
| 2009/0313049 A1* | 12/2009 | Joao | G06F 19/328 705/3 |

(Continued)

*Primary Examiner* — Abdelali Serrou
(74) *Attorney, Agent, or Firm* — Troutman Sanders LLP; Christopher J. Forstner; John A. Morrissett

(57) ABSTRACT

Examples of the present disclosure can comprise systems and methods for creating and modifying named entity recognition models. The system can use two or more existing named entity recognition models to output responses to natural language queries for which the models have not yet been trained. When the output from the two or more models match, the query and the resulting output can be stored as training data for a new named entity recognition model. If the output from the two or models do not match, the query and the outputs can be stored in an exceptions file for additional review. In some embodiments, the system can comprise one or more processors and a display for providing a user interface (UI).

15 Claims, 20 Drawing Sheets

(56) References Cited

U.S. PATENT DOCUMENTS

| | | | |
|---|---|---|---|
| 2012/0016678 A1* | 1/2012 | Gruber | G10L 15/22 |
| | | | 704/275 |
| 2015/0161521 A1* | 6/2015 | Shah | G06F 17/278 |
| | | | 706/12 |
| 2018/0157739 A1* | 6/2018 | Khaitan | H04L 67/10 |
| 2018/0240352 A1* | 8/2018 | Thomas | G06F 17/2765 |
| 2019/0005020 A1* | 1/2019 | Gregory | G06F 17/278 |
| 2019/0236148 A1* | 8/2019 | DeFelice | G06N 3/006 |

* cited by examiner

```
***total marketshare          Acme Exotic Cars may    ***

Most popular DEALER:          Acme Exotic Cars.   Is this correct? y
Thanks!

Most popular METRIC: total marketshare. Is this correct? y
Thanks!

Most popular DATE: none. Is this correct? n
What should the DATE be instead? may
That does not look right. What should the DATE be instead? may
Thanks!
```

FIG. 7

TRAINING SYSTEMS FOR PSEUDO LABELING NATURAL LANGUAGE

FIELD OF INVENTION

The present disclosure relates to systems for training models to recognize named entities, and more particularly providing systems for training and creating models to process requests for interactive real-time data using natural language processing.

BACKGROUND

Businesses often employ a salesforce to make sales to customers via sales calls. During a typical sales call, a salesperson may want to present information and data to the customer, such as inventory, prices, interest rates, prior sales figures, competitor information, and the like, in order to provide the customer with information in an attempt to make a sale. Such sales calls may often be short in duration, possibly lasting a minute or two. It can be crucial for salespeople to have quick access to relevant data, therefore, to present to a customer during such a call.

Automated chatbots can sometimes be used to retrieve this information; however, conventional chatbots are generally built to either provide answers to very specific question set (i.e., predetermined questions) or to provide superficial answers to a wide variety of questions. A conventional automated chatbot may be used to provide a user with their account balance, for example, or the temperature in a remote city. Consequently, any query given to the chatbot outside of the very specific question set it is programmed to respond to will be met with an error.

Teaching the chatbot to respond to more queries is a time-consuming and arduous process. The chatbot must be trained with labeled training data, and large amounts of labeled data are required to produce an accurate chatbot. If a query is given which was not in the training data, the chatbot will respond incorrectly or not at all. Conventional training methods therefore require intensive labeling and training processes to catch as many potential cases and queries as possible in a data scraping process. This process requires manual labeling and is a large consumer of manpower. Adaptable systems to respond to a broad variety of queries that can improve over time without the need for pre-labeled data are desirable.

Accordingly, there is a need for improved systems for training a chatbot, or other natural language system, to respond to a broad variety of queries and adapt to new queries not yet labeled in training data. Embodiments of the present disclosure are directed to this and other considerations.

SUMMARY

Disclosed herein are systems for training untrained named entity recognition models for use in an automated chatbot assistant through the pseudo labeling of training data by trained named entity recognition models.

The system can provide natural language processing and automated responses from a chatbot. In some embodiments, the system can comprise one or more processors and a display for providing a user interface (UI). The UI can comprise, for example, an input field for receiving an input from a user and a display window for displaying the user input and one or more responses. In some embodiments, the system can comprise two or more trained named entity recognition models. In some embodiments, the system can comprise a memory in communication with at least the one or more processors, the display and the two or more trained named entity recognition models and can store instructions to be executed by the one or more processors.

The one or more processors can receive a first input comprising a first natural language request, process the user input to apply pseudo labels for named entities to the user input using the two or more trained named entity recognition models, receive two or more pseudo label sets from the two or more trained named entity recognition models, and determine whether the pseudo labeled named entities match. In some embodiments, after the two or more processors determine whether the pseudo labeled named entities match, the two or more processors can be further configured to store the user input and corresponding pseudo labels in a labeled training data set when the pseudo labeled named entities match. When the pseudo labeled named entities do not match, on the other hand, the system can store the user input and the two or more pseudo labels in an entry to an exceptions file.

In some embodiments, the instructions can further cause the one or more processors to retrieve the labeled training data set, train an untrained named entity recognition model using the labeled training data set to create a new trained named entity recognition model, and store the new trained named entity recognition model in the memory. In some embodiments, the instructions to determine whether the pseudo labeled named entities match can further cause the one or more processors to receive a confidence level for each of the pseudo labels from the two or more trained named entity recognition models, average a value of the confidence levels, and determine that the average value is greater than a predetermined threshold value. In some embodiments, the instructions can further cause the one or more processors to determine that the exceptions file includes at least one entry, notify a reviewer to review the exceptions file via a reviewing UI, and receive corrected pseudo labeled named entities from the user via the UI. In some embodiments, the instructions can further cause the one or more processors to store the corrected entry in the new labeled training data set and train an untrained named entity recognition model using the new labeled data set to create a new trained named entity recognition model. These and other embodiments are disclosed herein.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIG. 7 is an example of a reviewer User Interface (UI) for reviewing pseudo labels and corresponding named entities, in accordance with some examples of the present disclosure;

DETAILED DESCRIPTION

Figure 1:
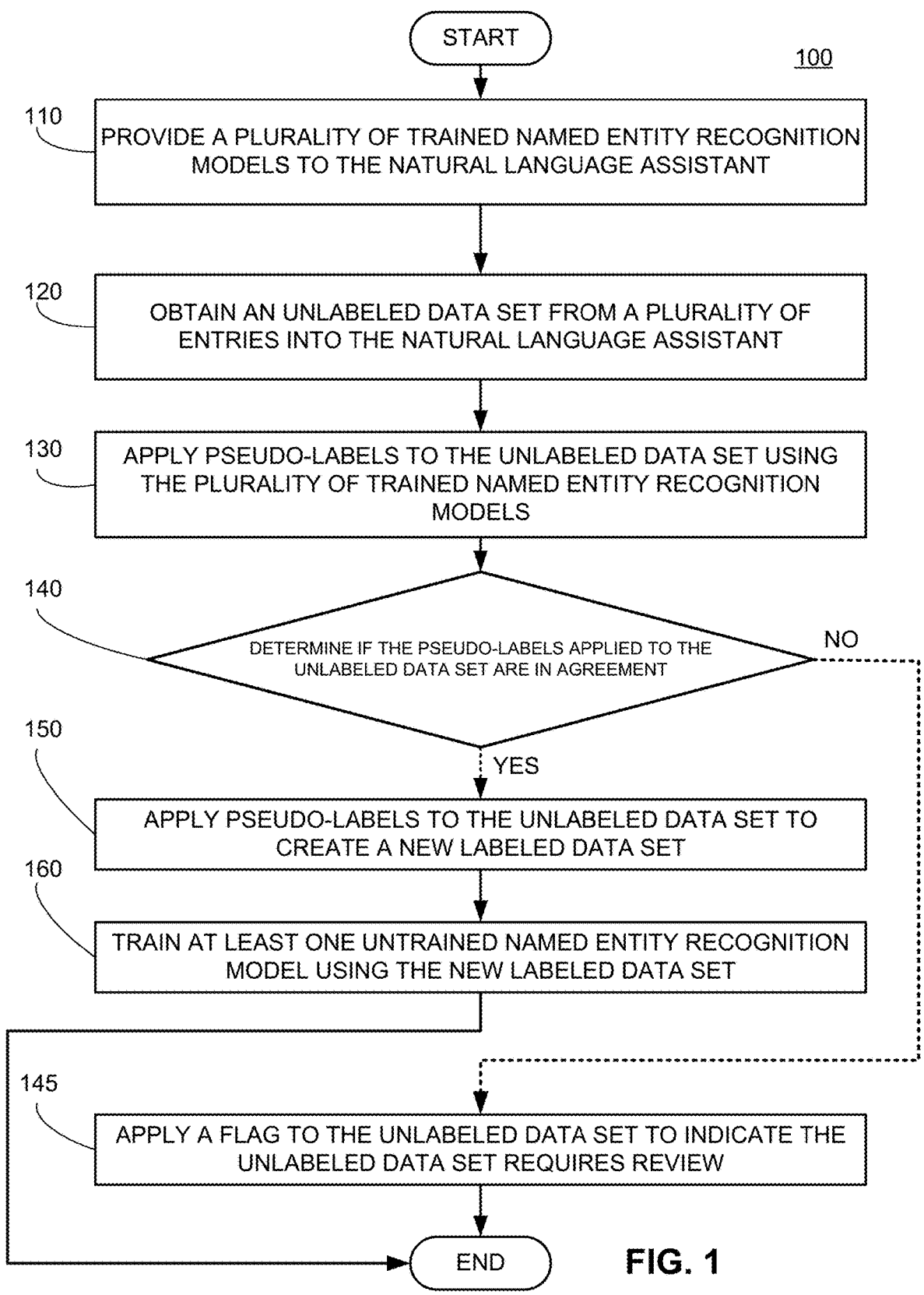
FIG. 1 is a flowchart of an example of a method for providing and training an automated assistant within a chat user interface for natural language processing, in accordance with some examples of the present disclosure.

Examples of the present disclosure can comprise systems and methods for creating and modifying named entity recognition models. The system can use two or more existing named entity models to output responses to natural language queries for which the models have not yet been trained. When the output from the two or more models match, the query and the resulting output can be stored as training data for a new named entity recognition model. If the output from the two or models do not match, the query and the outputs can be stored in an exceptions file for additional review. The system can enable a large training data set to be automatically generated with little, or no, human intervention.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

The system is described below as a system for generating training data and new named entity recognition models using existing trained entity recognition models. One of skill in the art will recognize that the system is not so limited; however, and that the system could also be used to produce training data and create other types of models. Indeed, the system can be used to create training data and new models for many types of tasks related to machine learning. The system could be used, for example, to analyze data and/or trends in data for financial analysis, business performance, logistics, and many other tasks. As described above, a problem with current natural language processing techniques is the necessity for large amounts of labeled training data. This training data is generally "scraped" from many sources to locate example queries, which are then labeled manually to indicate the correct named entities for training. Insufficient training data can reduce the accuracy of natural language models and may even limit the models to processing only the specific examples given in training data. This is especially true in the field of named entity recognition. When processing a natural language request, such as a text sentence, for example, named entity recognition is the process of extracting the parts of a sentence. The sentence: "Please deliver two pepperoni pizzas to 1600 Pennsylvania Avenue today at 7 pm," for instance, contains the entities of an item (pepperoni pizzas), a quantity (two), an address, a date (today), and a time (7 pm). In order for natural language processing model to extract the aforementioned named entities, it must first be trained with sufficient training data to recognize named entities. Thus, training data for such an application would require many text sentences with corresponding labels (e.g., "an item" or "an address") for the named entities. Disclosed herein are systems for improved natural language processing techniques that eliminate the need for time-intensive data scraping and labeling, and instead provide dynamic and adaptive processing techniques able to learn and improve without significant training data requirements.

Disclosed herein are systems that enable trained named entity recognition models to provide pseudo labels for natural language requests and to train an untrained named entity recognition model using the pseudo labeled data. In some embodiments, a natural language assistant such as an automated chatbot can be provided. The chatbot can be configured to receive natural language requests from a user and provide the natural language request to two or more trained named entity recognition models. The two or more trained named entity recognition models can then apply pseudo labels to the natural language request to extract the named entities. If the named entities provided in the pseudo labeling process match, the pseudo labels can be taken as true and the natural language request with labels can be stored as labeled training data. If the named entities do not match, the natural language request can be provided to the user, a reviewer, or a different named entity recognition model to apply the correct labels. The labeled training data can then be used to train a new named entity recognition model. In other words, the system provides models configured to label data for training a new model. Such embodiment system reduces the tedious scraping and labeling process and provides a dynamic and adaptive training method using constant inputs to the chatbot to gather data and create and apply new models to label the data more accurately and/or efficiently. This and other embodiments are disclosed herein.

Accordingly, the invention is not limited in its scope to the details of construction and arrangement of components set forth in the following description or examples. The invention is capable of other embodiments and of being practiced or carried out in various ways. Also, in describing the embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not imply a particular order of operation, preclude the presence of additional method steps, or preclude intervening method steps between those steps expressly identified. Similarly, it is also to be understood that the mention of one or more components in a device or system does not preclude the presence of additional components or intervening components between those components expressly identified.

The disclosed embodiments are directed to systems for applying pseudo labels to natural language requests to create labeled training data for an untrained, or new, named entity recognition model; and more particularly, to providing a system for a dynamic and adaptive automated assistant within a chat user interface. In some embodiments, the system may be configured to display, via an electronic display of a computing device, a chat user interface (UI) that can include an input field for receiving a natural language request by a user and a display window for displaying user messages and responses to the natural language request. The system can also be configured to receive, via the input field of the UI, a first text representing a natural language request for a first interactive data response. The system can further generate the first interactive data response in response to processing the first text using natural language processing techniques. In some embodiments, the system can display the first interactive data response in the display window of the UI.

In some embodiments, the system can be provided with natural language processing techniques to enable the system to process the natural language request. For example, the system can be configured to apply pseudo labels to the named entities of the natural language request. In some embodiments, the system can be provided two or more named entity recognition models to process the natural language request, which can each apply pseudo labels to the named entities of the natural language request.

The system can further be configured to determine if the named entities of the corresponding pseudo labels provided by each named entity recognition model match. When the named entities do match, the system can be configured to generate a response to the natural language request and to provide the response to the user via the UI. When the named entities do not match, on the other hand, the system can store the natural language request and corresponding pseudo labels in an exceptions file. The system can further be configured to store the natural language request with the corresponding pseudo labels in a labeled training data set. The labeled training data set can then be used to train an untrained named entity recognition model. The system provides an improved method for training a natural language processing system by gathering large amounts of training data and applying labels to the training data in a much faster and more efficient process than current methods.

In some embodiments, the system can be provided with instructions to determine if the named entities of the applied pseudo labels match. In response to applying pseudo labels to the natural language request, for example, each of the two or more named entity recognition models can output a confidence level to indicate the estimated accuracy of the named entities that have been labeled. A predetermined threshold value can be set to indicate that the named entities do match. In some embodiments, the confidence levels can be averaged, and the average value can be compared to the predetermined threshold value (e.g., 50%) to determine if the average confidence is greater than the threshold value or less than the threshold value. In some embodiments, the average confidence value being greater than the threshold value is indicative of a match, and the named entities with corresponding pseudo labels are stored as labeled training data. The average confidence value being less than the threshold value can be indicative of a mismatch, and the named entities with corresponding pseudo labels can be stored in an exceptions file. In other embodiments, the system may not provide confidence levels, but instead can be instructed to simply compare the values of the named entities and check if the corresponding pseudo labels contain the same values for the named entities. In some embodiments, the system can provide a flag variable, or similar, to a natural language request that did not return matching named entities rather than storing the request in an exceptions file to enable additional review.

In some embodiments, the system can be provided instructions to review named entities which do not match. In other embodiments, when the exceptions file has more than one entry, the exceptions file can be provided to a reviewer via a reviewing UI. In such an embodiment, the reviewer can observe the applied pseudo labels and corresponding named entities. The reviewer can also correct the pseudo labels, as necessary, via the reviewing UI. The corrected pseudo labels and corresponding named entities can then be accepted by the system and stored as additional labeled training data.

In some embodiments, when the named entities do not match, the system can immediately provide the user (i.e., as opposed to a dedicated reviewer) with the pseudo labels and corresponding named entities via the display window of the UI. The user can then correct the pseudo labels through the chat interface. The corrected pseudo labels and corresponding named entities can then be accepted by the system and stored as labeled training data and the response to the natural language request provided to the user through the UI.

In some embodiments, when the named entities do not match, the exceptions file can be provided to a separate trained named entity recognition model. The separate trained named entity recognition model can then apply a new set of pseudo labels to corresponding named entities. If the new set of pseudo labels match one or more of the initial two or more named entity recognition models, for example, the pseudo label can be taken to be correct and can be added to the labeled training data set. If, after further review, none of the pseudo labels match, the user input and the two or more pseudo labels can be included in the entry to an exceptions file. Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a flowchart of an example of a method 100 for training a new named entity recognition model using data gathered from a natural language chat assistant that is pseudo labeled by two or more existing named entity recognition models. In other words, as discussed above, the method 100 can provide natural language queries to two or more existing named entity recognition modeling for pseudo labeling. If the two or more existing models agree (i.e., the models label the named entities in the same way), then the pseudo labels and the query can be added to a training data set to create a new, more refined, model.

In block 110, the method 100 can provide a plurality (e.g., two or more) trained named entity recognition models to a system in communication with an automated assistant device, or similar.

In block 120, the method 100 can obtain an unlabeled data set from entries into the automated assistant device, or similar. Entries to the automated assistant device can be stored in a database, for example, and can be accessed by the method 100. In some embodiments, entries to the display UI (mentioned above) can immediately processed as unlabeled data. In some embodiments, the unlabeled data set can be provided by a user of the system as a separate file.

In block 130, the method 100 can process the unlabeled data set using the two or more trained named entity recognition models to apply pseudo labels to the named entities. For example, a user of the automated assistant device can input, "how many contracts did we fund with Acme Exotic Cars in October" into the display UI as a first text. The first text can then be provided to the two or more named entity recognition models in the system to be processed. The models can apply pseudo labels to the unlabeled data set, which comprises the first text. For instance, the pseudo labels "dealer," "item," and "date" can be applied to "Acme Exotic Cars," "contracts," and "October," respectively.

In block 140, the method 100 can determine whether or not the pseudo labels applied by each of the two or more trained named entity recognition models match. For example, if all models apply the label "item" to the entity "contracts," then the models are taken to agree. In this instance, the pseudo labels are taken to be true and associated with the first text to create a labeled data set, as shown in block 150. The labeled data set can then be used to train an untrained model or to further train the two or more trained models, as shown in block 160. However, if most models apply the label "item" to the entity "contracts," but one model mistakenly applies the label to "many contracts," then the models are taken to be not in agreement. In this instance, a flag can be applied to the first text to indicate that review is needed, as shown in block 145.

Figure 2:
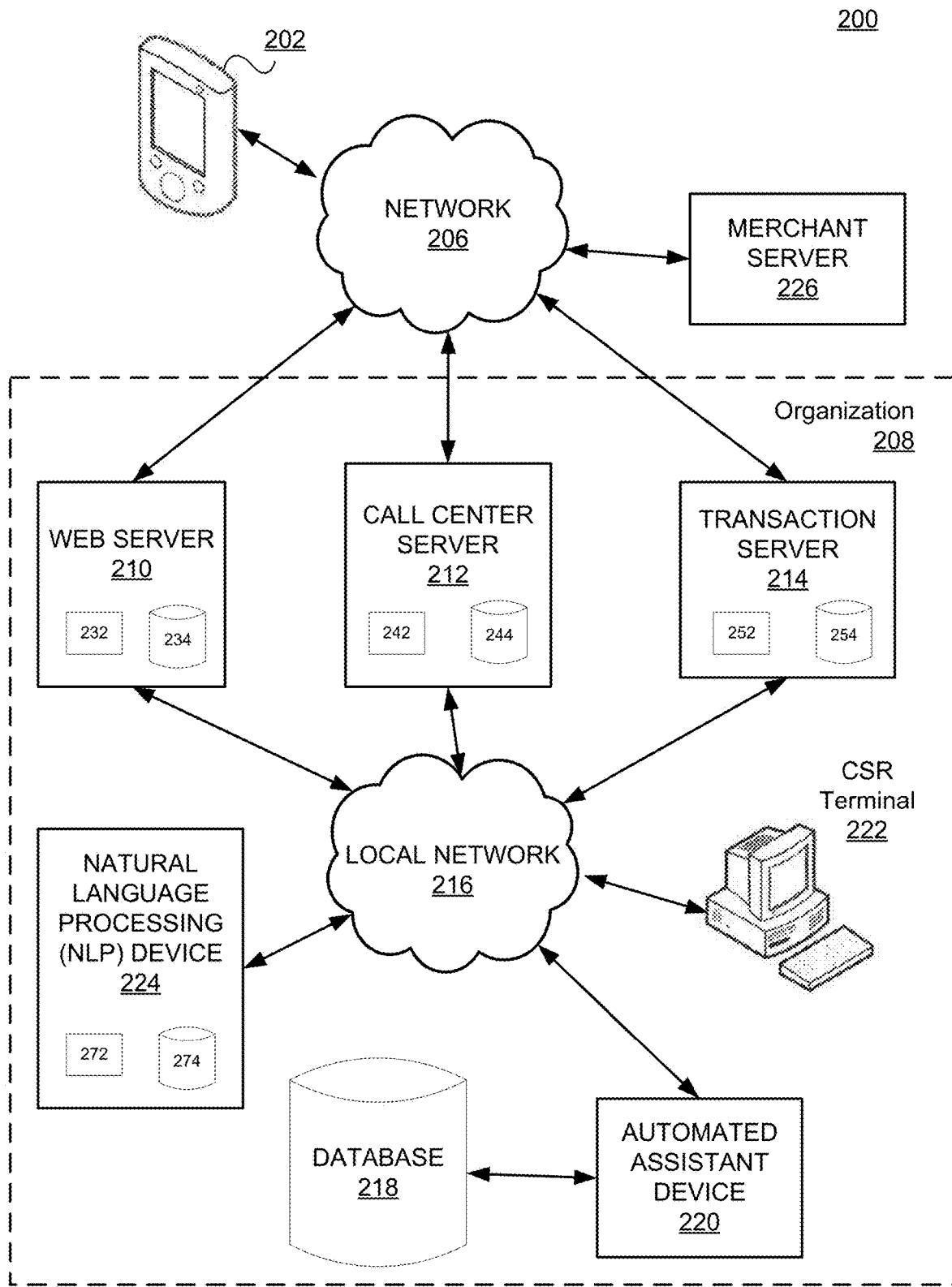
FIG. 2 is a diagram of an example of a system that may be used to provide interactive data via an automated assistant, in accordance with some examples of the present disclosure.

FIG. 2 is a diagram of an example of a system 200 that may be configured to provide a first interactive data response via a user interface. In some embodiments, the first interactive data response may be provided via an automated assistant within a chat user interface (e.g., a "chatbot"). The components and arrangements shown in FIG. 2 are not intended to limit the disclosure as the components used to implement the disclosed processes and features may vary. As shown, system 200 may include a user device 202, a network 206, a merchant server 226, and an organization 208 including, for example, a web server 210, a call center server 212, a transaction server 214, a local network 216, a database 218, an automated assistant device 220, a customer service representative (CSR) terminal 222, and a natural language processing (NLP) device 224.

The automated assistant device 220 may include a computer system configured to facilitate the presentation of automated messages and interactive data responses to a user of the CSR terminal 222. According to some embodiments, the automated assistant device 220 may receive a user message from the CSR terminal 222, which may be, for example, a natural language request for interactive data responses, a response to a question, or other statements made by a user of the CSR terminal 222. According to some embodiments, the automated assistant device 220 may cause the user message to be processed using natural language processing techniques by, for example, forwarding the user message to the NLP device 224.

According to some embodiments, the automated assistant device 220 may receive a request for interactive data responses from the NLP device 224. The automated assistant device 220 may forward a user message saying "I want to see total 'Brand X' apps" to the NLP device 224; for example, and after processing the user message with the NLP device 224, the automated assistant device 220 may receive a request for information relating to the total number of loan applications for Brand X dealerships. According to some embodiments, the automated assistant device 220 may access interactive real-time data pertaining to the request. In response to receiving the request for information relating to the total number of loan applications for Brand X dealerships, for example, the automated assistant device 220 may access the database 218 to determine the total number of loan applications for Brand X dealerships. The automated assistant device 220 may then send the data to the CSR terminal 222 to display the answer to the user. Although the disclosure refers to the display of interactive real-time data, it should be understood it is also contemplated that data that is not interactive or automatically updated in real time may also be displayed by the CSR terminal 222 in a manner similar to that described with respect to the interactive real-time data.

In some embodiments, the automated assistant device 220 may retrieve data from multiple sources and aggregate the data for display by the CSR terminal 222. In some embodiments, the automated assistant device 220 may determine a format in which to display the retrieved interactive data response. The automated assistant device 220 may determine that the retrieved data may be displayed as, for example, a bar chart, graph, table, pie chart, treemap, line chart, scatter plot, area chart, steamgraph, bubble chart, heatmap, polar chart, pyramid chart, or any other such form of organizing and/or displaying data. According to some embodiments, the automated assistant device 220 may determine a display format of interactive real-time data based on one or more of a predefined user preference, user historical data (e.g., the format the user has used to view similar data in the past), or a predetermined display format that is associated with the data that may be, for example, designated by a system administrator or user. According to some embodiments, the automated assistant device 220 may utilize machine learning techniques, such as Naive Bayes classifiers, decision trees, named entity recognition, and other such techniques to make determinations about what data to present to the user based on the user request, the format used to present the data (e.g., chart vs. table), and recommendations for data to present to the user that the user has not specifically requested. Based on the current state of the conversation with a merchant customer (e.g., what data has already been displayed to a user of the CSR terminal 222 during the conversation), for example, historical usage of the user, and/or data requested with respect to a particular merchant or customer, automated assistant device may utilize machine learning to make predictions about what data a particular user may want to view next and generate recommendations to present to the user.

The natural language processing device (NLP device) 224 may include a computer system configured to receive and process user messages and determine a meaning of the user messages. As will be understood by those of skill in the art, the NLP device 224 may use natural language processing techniques and features such as syntax analysis, parsing, part-of-speech tatting, sentence breaking, morphological segmentation, word segmentation, stemming, terminology extraction, lexical semantics, machine translation, named entity recognition, natural language generation, natural language understanding, relationship extraction, sentiment analysis, topic segmentation and analysis, word sense disambiguation, and the like to implement an automated chatbot that may be capable of determining the meaning of a user message and automatically responding appropriately. If a user message says, for example, "provide total apps for Brand X," the NLP device 224 may determine that a user is requesting information about the total of number of loan applications relating to Brand X dealerships.

Accordingly, the NLP device may generate a request for the total number of loan applications relating to Brand X dealerships that may then be used by the system 200 (e.g., via the automated assistant device 220) to retrieve the associated data for display on the CSR terminal 222. In some embodiments, the NLP device 224 may be configured to automatically generate a natural language message, that may be referred to herein as a system message, which may be displayed via the chat user interface by the CSR terminal 222. In some embodiments, the NLP device 224 may generate a system message in response to a user message. The NLP device 224 may also generate a system message prompting a user to provide an answer to a question. The system 200 (e.g., via the automated assistant device 220) may determine that a user may be interested in a particular set of data, for example, despite not having requested the data. In response to that determination, the NLP device 224 may generate a system message saying, for example, "Would you like to view the total number of auto loan applications for Brand X in the last two months?", which may be sent to the CSR terminal 222 for display.

In some embodiments, the NLP device 224 can comprise, or can comprise access to, two or more trained named entity recognition models. For example, the NLP device 224 can utilize the Stanford Named Entity Recognizer (NER), Stanford Core NLP, spaCy, Natural Language Toolkit, Gensim, Apache OpenNLP, Word2vec, fastText, or any other provided NER/NLP system. Alternatively, an NER system can be constructed on the NLP device 224 utilizing techniques known in the art. Suitable examples of techniques for constructing an NER system can include, but are not limited to, recurrent neural networks (RNN), neural networks, long short-term memory (LSTM), bidirectional LSTM, conditional random fields (CRF), maximum entropy Markov models, LSTM-CRF networks, bidirectional-LSTM-CRF networks, deep learning networks, and the like.

In some embodiments, the NLP device 224 may utilize machine learning techniques to increase its accuracy in correctly understanding the meaning of user messages. With respect to a particular user, for example, the NLP device 224 may track and analyze the apparent satisfaction with the data provided in response to the user message to learn which responses best fulfill the particular user's request, based on the language of the user message. According to some embodiments, the NLP device 224 may determine that a user was satisfied with a response, for example, when the user interacted with data included in the response. In some embodiments, the NLP device 224 may determine that a user was not satisfied with the response if the user submits a second request for data within a predetermined amount of time. If the user message says, "show me applications for Brand X," and the NLP device 224 generates a chart of the total number of auto loan applications for a particular Brand X dealership on the CSR device 222 and, within 5 seconds of the CSR device 222 displaying the chart, the user inputs a second user message saying, for example, "show me total applications for Brand X," then the NLP device 224 may determine that the user was unsatisfied with the response.

The NLP device 224 may have one or more processors 272 and one or more NLP databases 274, which may be any suitable repository of the NLP data. Information stored in the NLP device 224 may be accessed via local network 216 and/or network 206 by one or more devices (e.g., the dialogue management device 220) of the system 200. In some embodiments, the NLP processor 272 may be used to implement an NLP system that can determine the meaning behind a user message and convert it to a form that can be understood by other devices (e.g., other computers), generate instructions to other devices based on the determined meaning, and/or generate natural language responses and messages to be displayed to user via the CSR terminal 222.

In some embodiments, a customer may operate the user device 202. The user device 202 can include one or more of a mobile device, smart phone, general purpose computer, tablet computer, laptop computer, telephone, PSTN landline, smart wearable device, voice command device, other mobile computing device, or any other device capable of communicating with the network 206 and ultimately communicating with one or more components of the organization 208. In some embodiments, a user device may include or incorporate electronic communication devices for hearing or vision impaired users. The user device 202 may belong to otherwise be associated with a customer. Customers may include individuals such as, for example, subscribers, clients, prospective clients, or customers of an entity associated with the organization 208, such as individuals who have obtained, will obtain, or may obtain a product, service, or consultation from an entity associated with the organization 208. For example, a customer or potential customer may be a car dealership seeking a bank to issue a loan to a purchaser of a vehicle and the user device 202 may be a mobile phone or landline associated with the car dealership. As will be appreciated, when making a phone call, the user device 202 may transmit caller ID information, such as a name or phone number associated with the user device 202 or the owner or operator of the user device 202. In some embodiments, caller ID information may be obtained for the user device 202 without the user device transmitting the caller ID information.

The network 206 may be of any suitable type, including individual connections via the internet such as cellular or WiFi networks. In some embodiments, the network 206 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN.

Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 206 may comprise any type of computer networking arrangement used to exchange data. For example, the network 206 may be the Internet, a private data network, virtual private network using a public network, and/or other suitable connection(s) that enables components in the system environment 200 to send and receive information between the components of the system 200. The network 206 may also include a public switched telephone network ("PSTN") and/or a wireless network.

The organization 208 may be associated with an entity such as a business, corporation, individual, partnership, or any other entity that provides one or more of goods, services, and consultations to individuals such as customers. For example, in some embodiments, the organization 208 may be associated with a financial services provider.

The organization 208 may include one or more servers, devices, and computer systems for performing one or more functions associated with products and/or services that the organization 208 provides. Such servers, devices, and computer systems may include, for example, a web server 210, a call center server 212, a transaction server 214, a database 218, an automated assistant device 220, a CSR terminal 222 and a NLP device 224, as well as any other computer systems necessary to accomplish tasks associated with the organization 208 or the needs of customers (which may be customers of the entity associated with the organization 208).

The web server 210 may include a computer system configured to generate and provide one or more websites accessible to customers, as well as any other individuals involved in the organization 208's normal operations. The web server 210 may include a computer system configured to receive communications from a user device 202 via for example, a mobile application, a chat program, an instant messaging program, a voice-to-text program, an SMS message, email, or any other type or format of written or electronic communication. The web server 210 may have one or more processors 232 and one or more web server databases 234, which may be any suitable repository of website data. Information stored in the web server 210 may be accessed (e.g., retrieved, updated, and added to) via the local network 216 and/or the network 206 by one or more devices of the system 200. According to some embodiments, the web server 210 may receive communications from customers, such as inquiries regarding the purchase or sale of products or services. For example, the web server 210 may receive a message inquiring about the availability of a car loan via a web-enabled chat application, instant message, email, or other electronic user input transmit to the web server 210 via, for example, the user device 202. In some embodiments, the web server 210 may be configured to facilitate a chat session or instant messaging session between a customer service representative using a customer service terminal and a customer using the user device 202.

The call center server 212 may include a computer system configured to receive, process, and route telephone calls and other electronic communications with a customer operating the user device 202. The call center server 212 may have one or more processors 242 and one or more call center databases 244, which may be any suitable repository of call center data. Information stored in the call center server 212 may be accessed (e.g., retrieved, updated, and added to) via the local network 216 and/or the network 206 by one or more devices of the system 200. In some embodiments, the call center server processor 242 may be used to implement an interactive voice response (IVR) system that interacts with the customer over the phone. In some embodiments, the call center server 212 may be configured to route an incoming call to a customer service representative. In some embodiments, the call center server 212 may receive caller ID information in association with an incoming phone call, such as a phone call made by the user device 202. Caller ID information may include information such as a name, phone number or the identity of a caller associated with the incoming call and may cause the caller ID information to be displayed to a customer service representative via for example, a phone, a computer, or other device used by the customer service representative. In some embodiments, the call center server 212 may identify a customer based on the caller ID information and may cause information associated with the identified customer to be displayed to a customer service representative. For example, if the call center server 212 determines that an incoming call is being made from a particular car dealership, the call center server 212 may cause information relating to the particular car dealership, such as the name of the dealership, the name of the individual making the call, previous sales of loans to the dealership, and other information that may be useful to a sales person, to display at a customer service terminal, such as a computer used by a sales person. In some embodiments, the call center server processor 242 may be configured to perform a voice-to-text functionality such that the call center server 212 may convert words spoken on an incoming call into text.

The transaction server 214 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, an issued loan, previous loan payments, and any other type of transaction associated with the products and/or services that an entity associated with the organization 208 provides to individuals such as customers. The transaction server 214 may have one or more processors 252 and one or more transaction server databases 254, which may be any suitable repository of transaction data. Information stored in the transaction server 214 may be accessed (e.g., retrieved, updated, and added to) via the local network 216 and/or the network 206 by one or more devices of the system 200.

The local network 216 may comprise any type of computer networking arrangement used to exchange data in a localized area, such as WiFi, Bluetooth™, Ethernet, and other suitable network connections that enable components of the organization 208 to interact with one another and to connect to the network 206 for interacting with components in the system environment 200. In some embodiments, the local network 216 may comprise an interface for communicating with or linking to the network 206. In other embodiments, components of the organization 208 may communicate via the network 206, without a separate local network 216.

According to some embodiments, the database 218 may be a database associated with the organization 208 and/or its related entity that may store a variety of information relating to customers, transactions, customer information, and business operations. The database 218 may also serve as a back-up storage device and may contain data and information that is also stored on, for example, local databases associated with the web server 210, the call center server 212, the transaction server 214, the automated assistant device 220, the CSR terminal 222, or the NLP device 224. The database 218 may be accessed by other devices and may be used to store records of every interaction, communication, and/or transaction a particular customer has had with the organization 208 and/or its related entity.

According to some embodiments, the automated assistant device 220 may establish a communication link between the CSR terminal 222 and one or more devices that store the interactive real-time data for display at the CSR terminal 222 (such storage devices may be referred to as the "source" of the data), so that if any of the interactive data is updated at the source, then the automated assistant device 220 may cause the data to be automatically updated at the CSR terminal 222. For example, if a user has requested interactive data representing the total number of auto loan applications for the current month for 10 different dealerships, then the automated assistant device 220 may establish a communication link between the CSR terminal 222 and a device that stores the auto loan application data sought, such as for example, the database 218, in order to facilitate the display of the data stored at the database 218 by the CSR terminal 222. If the number of auto loan applications for a particular dealership is updated at the database 218, due to a recent sale, for example, then the automated assistant device 220 may cause the displayed number of auto loan applications for that dealership to increase at the CSR terminal 222. In this way, a salesperson utilizing the chat user interface described herein at the CSR terminal 222 may view data in the display window that is automatically updated in real-time. According to some embodiments, a user of the CSR terminal 222 may also cause updates to be made to the interactive data via the chat user interface. In some embodiments, a user of the CSR terminal 222 viewing interactive data in a display window of a chat user interface may input a change to the data, by for example, performing some input action with respect to the data, such as clicking, highlighting, dragging, swiping, tapping, or inputting text. For example, a user may view interactive real-time data that represents an auto loan application form via the CSR terminal 222, and the user may be enabled to input information into the form and select a "submit" button that signifies the submission of the application. In response to submitting the application, the automated assistant device 220 may cause the auto loan application data to be transferred to a storage device, such as the database 218, and may further cause other interactive data to update, such as, for example, the total number of auto loan applications associated with the dealership that was the subject of the auto loan application. In this way, the system 200 provides capabilities for multiple salespeople to utilize different CSR terminals 222 simultaneously, and the automated assistant device 220 may enable the data being displayed by the chat user interface at each CSR terminal 222 to be up to date in real time, in response to changes being made to the interactive data by one or more of the salesmen or from other sources that have access to the data stored at the source.

The CSR terminal 222 may include, but is not limited to, a terminal, a desktop computer, a laptop computer, a mobile device such as a smart phone or tablet device, and any other computerized devices configured to communicate with the local network 216 to perform various functions relating to the organization 208 such as, for example, receiving telephone calls and conducting teleconferences with customers, engaging in written conversations with customers using a chat, instant messaging, or email program, accessing, viewing, and/or modifying customer data stored by any device associated with the organization 208 (e.g., the database 218), and any other functions associated with the organization 208's products or services including analyzing individuals' data, placing orders, cancelling orders, issuing credits and refunds, processing withdrawals, deposits, and transfers, and other functions relating to products, services, or accounts associated with customer. The CSR terminal 222 may be configured to display a chat user interface to a customer service representative that may provide an automated chat functionality that may enable a customer service representative to request customer data and other information in real-time.

An employee may operate the CSR terminal 222, and the employee may comprise any individual employed by the organization 208 or involved in the operations of the organization 208 including, for example, a customer service agent/representative, an account manager, a product or service manager, a salesperson, etc. Additionally, in some embodiments, the organization 208 may comprise a plurality of CSR terminals 222 and employees. In some embodiments, the CSR terminal 222 may enable a salesperson to hold voice conversations with a customer or merchant via the call center server 212 (e.g., via voice-over-IP) or written conversations with a customer or merchant via the web server 210 (e.g., via a chat program). The CSR terminal 222 may display an interactive chat user interface that may enable a salesperson to converse with an automated chatbot (e.g., via the automated assistant device 220), and view and interact with real time data, such as for example, sales reports, market intelligence reports, planning reports, real time inventory reports, compensation or commission reports, ranking reports, productivity reports. As will be described in greater detail below, in some embodiments, a chat user interface may be configured to display user messages, system messages, and interactive real-time data. User messages may be messages that are generated in response to receiving text input by a user (e.g., a salesman typing a message into an input field) and system messages may be messages that are automatically generated by the system 200 (e.g., via the automated assistant device 220) in response to a user message, prompting the user to input a response, or simply providing the user with information. Interactive real-time data may be data that is stored on a database of the CSR terminal 222, a cloud server, or another device associated with the organization 208 (e.g., the database 218) and it may be displayed by the CSR terminal 222 in the form of charts, tables, graphs, pie charts, treemaps, line charts, scatter plots, area charts, steamgraphs, bubble charts, heatmaps, polar charts, pyramid charts or any other such form or format of representing data. According to some embodiments, the interactive real-time data displayed by the CSR terminal 222 may be interactive because the system 200 (e.g., the automated assistant device 220) may generate selectable charts, tables, graphs and/or maps or charts, tables, graphs and/or maps with one or more selectable portions for display by a chat user interface. For example, in some embodiments, each bar of a bar chart may be selectable, and upon being selected may cause some effect, such as for example, modifying the form of the data displayed (e.g., change a bar chart into a line graph), modifying the resolution of the data displayed (e.g., change a display of data by year to a display of data by month), modifying the content of the data displayed (e.g., change from showing September sales to showing October sales), or any other such change or manipulation of the data that may be useful to a user of the chat user interface 400. The system 200 may assign event listeners to selectable portions of interactive data displayed by a display window 402 that may be configured to detect when a portion has been selected by a user by, for example, clicking on a bar of a bar chart. The system 200 (e.g., via the automated assistant device 220) may associate predetermined functions with selectable portions of the interactive data, as well as buttons or other selectable regions of a display window 402 or a chat user interface 400. Accordingly, the system 200 may execute an associated predetermined function upon detecting the input of a user selection. For example, if the system 200 detects that a user has clicked on a bar of a bar chart, the system 200 may execute a predetermined function that causes a display window 402 to display a new bar chart depicting the disaggregated data included in the selected bar of the first bar chart. According to some embodiments, the interactive real-time data displayed by a chat user interface 400 may be considered to be real-time data because the data displayed by a chat user interface 400 may be bound to the source of the data (e.g., the database 218) such that the data may be automatically updated in a chat user interface 400 if it is updated at the source. According to some embodiments, interactive real-time data displayed by a chat user interface 400 may be automatically updated using long polling by, for example, the CSR terminal 222 periodically pinging the source of the data for updates.

The merchant server 226 may be one or more computing devices that store merchant information. Merchant information may be, for example, inventory, prices, customer lists, loan application data, sales information, location information associated with store locations, customer information including customer demographics, and any other information about customers, products, services, or business operations that a merchant may store. In some embodiments, the merchant server 226 may be associated with a customer making an incoming call to the system 200 via, for example the user device 202. For example, in some embodiments, the merchant server 226 may be associated with a car dealership and the merchant server 226 may include merchant data relating to the dealership's inventory of vehicles, outstanding auto loans with customer, auto loan applications in progress, historical sales information, and customer information. According to some embodiments, the web server 210 may be configured to exchange data with the merchant server 226 via the network 206. For example, in some embodiments, the web server 210 may receive information regarding auto loan applications associated with customers of a car dealership or the web server 210 may provide the merchant server 226 with a quote for a loan to be issued in response to a loan application or any other data that may facilitate a transaction between the entity associated with the organization 208 and the customer (e.g., dealership) associated with the merchant server 226.

Although the preceding description describes various functions of a web server 210, a call center server 212, a transaction server 214, a database 218, an automated assistant device 220, a CSR terminal 222, a natural language processing (NLP) device 224, and a merchant server 226, in some embodiments, some or all of these functions may be carried out by a single computing device. For example, some or all of the functions of a web server 210, a call center server 212, a transaction server 214, a database 218, an automated assistant device 220, a CSR terminal 222, and an NLP device 224 may be carried out by a single device.

For ease of discussion, embodiments may be described in connection with use of a user interface by a customer service representative to load, view and interact with real-time data during a sales call by utilizing natural language processing techniques to identify the data being sought by the customer service representative, and in particular, a sales call related to the issuance of a loan to a purchaser of an automobile from a car dealership. It is to be understood, however, that disclosed embodiments are not limited to use of the chat user interface during sales calls, but rather the embodiments described herein may be applied to providing a user interface that is capable of automatically providing real-time data in response to user requests in many other contexts. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all, or a portion, of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 3:
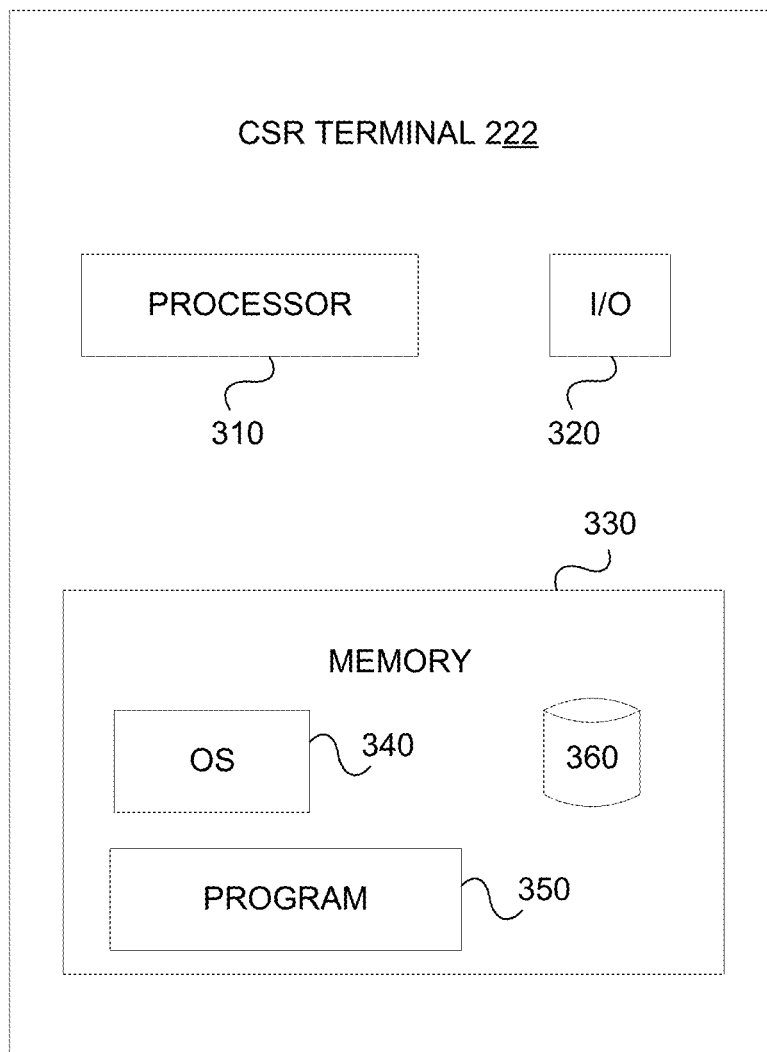
FIG. 3 is a component diagram of an example of a customer service representative terminal.

An exemplary embodiment of the CSR terminal 222 is shown in more detail in FIG. 3. The web server 210, the call center server 212, the transaction server 214, the automated assistant device 220, the NLP device 224, the merchant server 226, and/or the user device 202 may have a similar structure and may include many components that are similar to or even have the same capabilities as those described with respect to the CSR terminal 222. As shown, the CSR terminal 222 may include a processor 310, an input/output ("I/O") device 320, a memory 330 containing an operating system ("OS") 340 and a program 350. For example, the CSR terminal 222 may be a single device or server or may be configured as a distributed computer system including multiple servers, devices, or computers that interoperate to perform one or more of the processes and functionalities associated with the disclosed embodiments. In some embodiments, the CSR terminal 222 may further include a peripheral interface, a transceiver, a mobile network interface in communication with the processor 310, a bus configured to facilitate communication between the various components of the CSR terminal 222, and a power source configured to power one or more components of the CSR terminal 222.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 330.

The processor 310 may be one or more known processing devices, such as a microprocessor from the Pentium™ family manufactured by Intel™ or the Turion™ family manufactured by AMD™. The processor 310 may constitute a single core or multiple core processor that executes parallel processes simultaneously. For example, the processor 310 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The CSR terminal 222 may include one or more storage devices configured to store information used by the processor 310 (or other components) to perform certain functions related to the disclosed embodiments. In some embodiments, the CSR terminal 222 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, the CSR terminal 222 may include the memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the CSR terminal 222 may include the memory 330 that may include one or more programs 350 to perform one or more functions of the disclosed embodiments. Moreover, the processor 310 may execute one or more programs 350 located remotely from the system 200. For example, the system 200 may access one or more remote programs 350, that, when executed, perform functions related to disclosed embodiments. In some embodiments, the CSR terminal 222 may include a program that when executed, generates a chat user interface for providing interactive data in real time, as described in greater detail below with respect to FIGS. 4A-K.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a database 360 for storing related data to enable the CSR terminal 222 to perform one or more of the processes and functionalities associated with the disclosed embodiments.

The CSR terminal 222 may also be communicatively connected to one or more memory devices (e.g., databases) locally or through a network. The remote memory devices may be configured to store information and may be accessed and/or managed by the CSR terminal 222. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

The CSR terminal 222 may also include one or more I/O devices 320 that may comprise one or more interfaces for receiving signals or input from devices and providing signals or output to one or more devices that allow data to be received and/or transmitted by the CSR terminal 222. For example, the CSR terminal 222 may include interface components, which may provide interfaces to one or more input devices, such as one or more keyboards, mouse devices, touch screens, track pads, trackballs, scroll wheels, digital cameras, microphones, sensors, and the like, that enable the CSR terminal 222 to receive data from one or more users. The CSR terminal 222 may include a display, a screen, a touchpad, or the like for displaying images, videos, data, or other information.

In exemplary embodiments of the disclosed technology, the CSR terminal 222 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

As shown in FIGS. 4A-K, the CSR terminal 222 may be configured to generate and/or display a chat user interface 400 for providing interactive data in real time. The chat user interface 400 may include a display window 402 for displaying messages and interactive data, and an input field 404 for enabling a user to input text via, for example, a user typing on a keyboard connected to the CSR terminal 222. As shown, in some embodiments, the display window 402 may display an ongoing conversation between a user and a chatbot. Accordingly, the display window 402 may be configured to display system messages 410 that are automatically generated by the system 200 (e.g., via the automated assistant device 220), user messages 414 that are generated via user input, interactive real-time data requested by the user, or other data or information generated by the system, such as, for example, an instruction window 416 providing information about useful commands and shortcuts that may be used in conjunction with the system 200 to elicit automatic responses, information, and/or interactive real time data. In some embodiments, system messages and interactive real-time data automatically posted to the display window 402 by the system 200 may be associated with a chatbot avatar 408 and user messages 414 may be associated with a user avatar 412 so that a user may easily visually distinguish between the system messages 410 and the user messages 414.

According to some embodiments, text input to the input field 404 may be submitted to the system 200 for processing (e.g., to determine the meaning of the user submitted text and generate a response) in response to, for example, the system receiving an indication that a user has clicked on a "Send" button 406. According to some embodiments, in response to the selection of the "Send" button 406, text that has been input into the input field 404 may then be processed by, for example, the automated assistant device 220 and/or the NLP device 224, and may also be displayed as a user message in the display window 402. According to some embodiments, the display window 402 may be configured to display the most recently submitted user message, system message, data, or other information at the bottom of the display window 402 and push older content upwards. In some embodiments, the display window 402 may include a scroll bar that may allow a user to scroll up to view older messages and data. As will be appreciated by those of skill in the art, the display window 402 may include a scroll bar that enables a user to scroll up and view older messages and representations of data that have been displaced out of view by newer messages and data.

According to some embodiments, the CSR terminal 222 may display interactive real-time data stored by the system 200. In some embodiments, the CSR terminal 222 may store data that may be displayed by the CSR terminal 222. In some embodiments, the database 218, the automated assistant device 220, the web server 210, the call center server 212, the transaction server 214 and/or the NLP device 224 may store interactive real-time data that may be displayed by the CSR terminal 222. According to some embodiments, the data that is available to be displayed by the CSR terminal 222 may be stored in a closed system, such as within the organization 208. In other words, limiting the data that the CSR terminal 222 may access for display to data that is stored by devices that are all controlled by an entity associated with the organization 208 such that the data may not be deleted, added to, or modified by anyone who is not authorized by an entity associated with the organization 208 may be beneficial in enabling the use of machine learning and natural language processing techniques to be more effectively used with the data. For example, the automated assistant device 220 and/or the NLP device 224 may utilize machine learning techniques to better understand what a particular salesperson or group of salespeople mean when a user message is processed by the system, without being influenced by examples created by people outside the controlled system. Further, storing the data in a closed system may allow users of the system 200 to have better insights into the context and meaning of the data displayed by the CSR terminal 222 because the closed system may enable the users to understand the domain of data that the system has access to. In some embodiments, the CSR terminal 222 may be configured to display data or information sourced from outside of the organization 208. For example, in some embodiments, the CSR terminal 222 may display data or information received from the merchant server 226, such as for example, information relating to auto loan applications associated with a dealership.

Figure 4A:
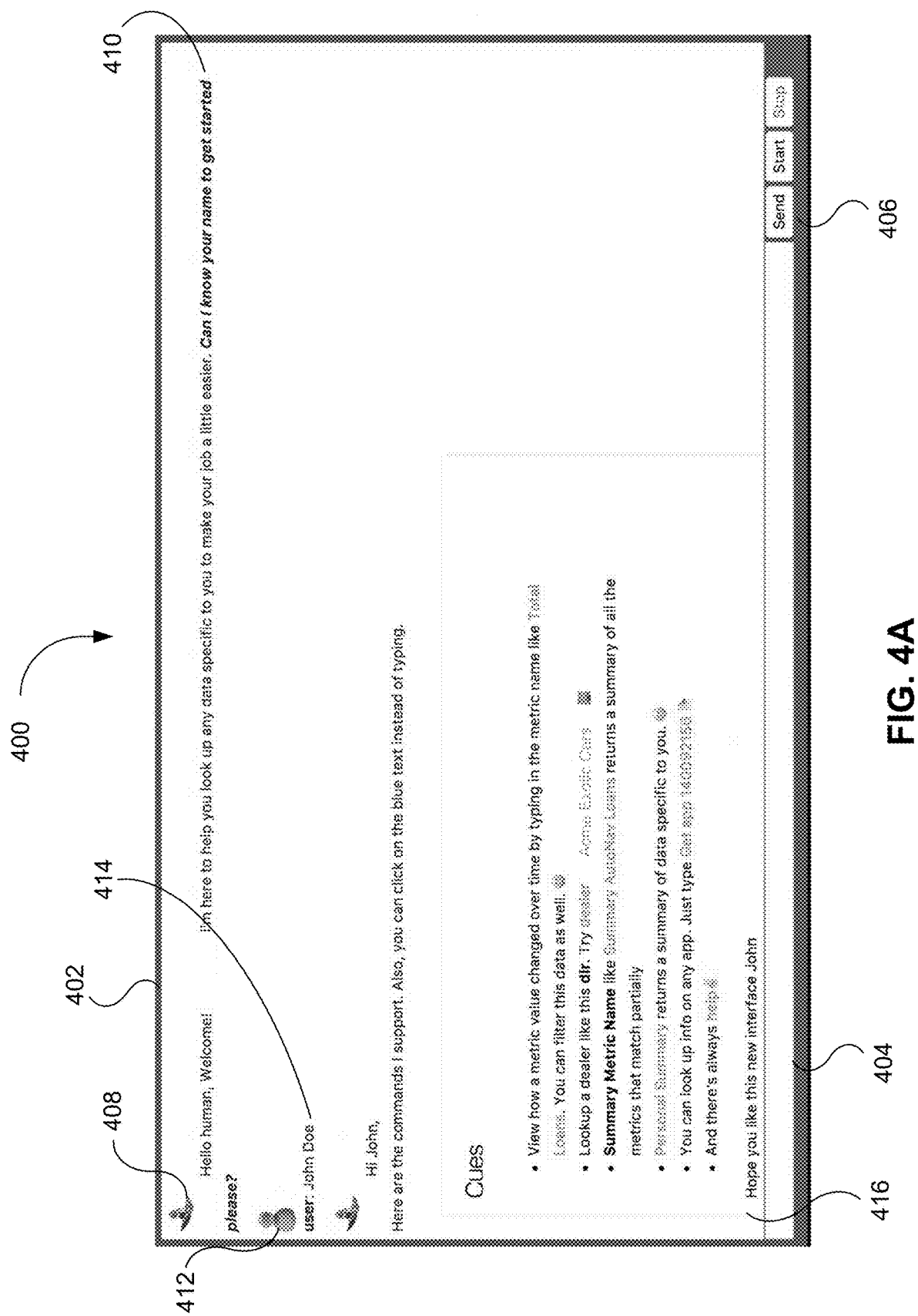
FIGS. 4A-4K are examples of chat user interfaces of a system to provide interactive data via an automated assistant, in accordance with some examples of the present disclosure.
Figure 4B:
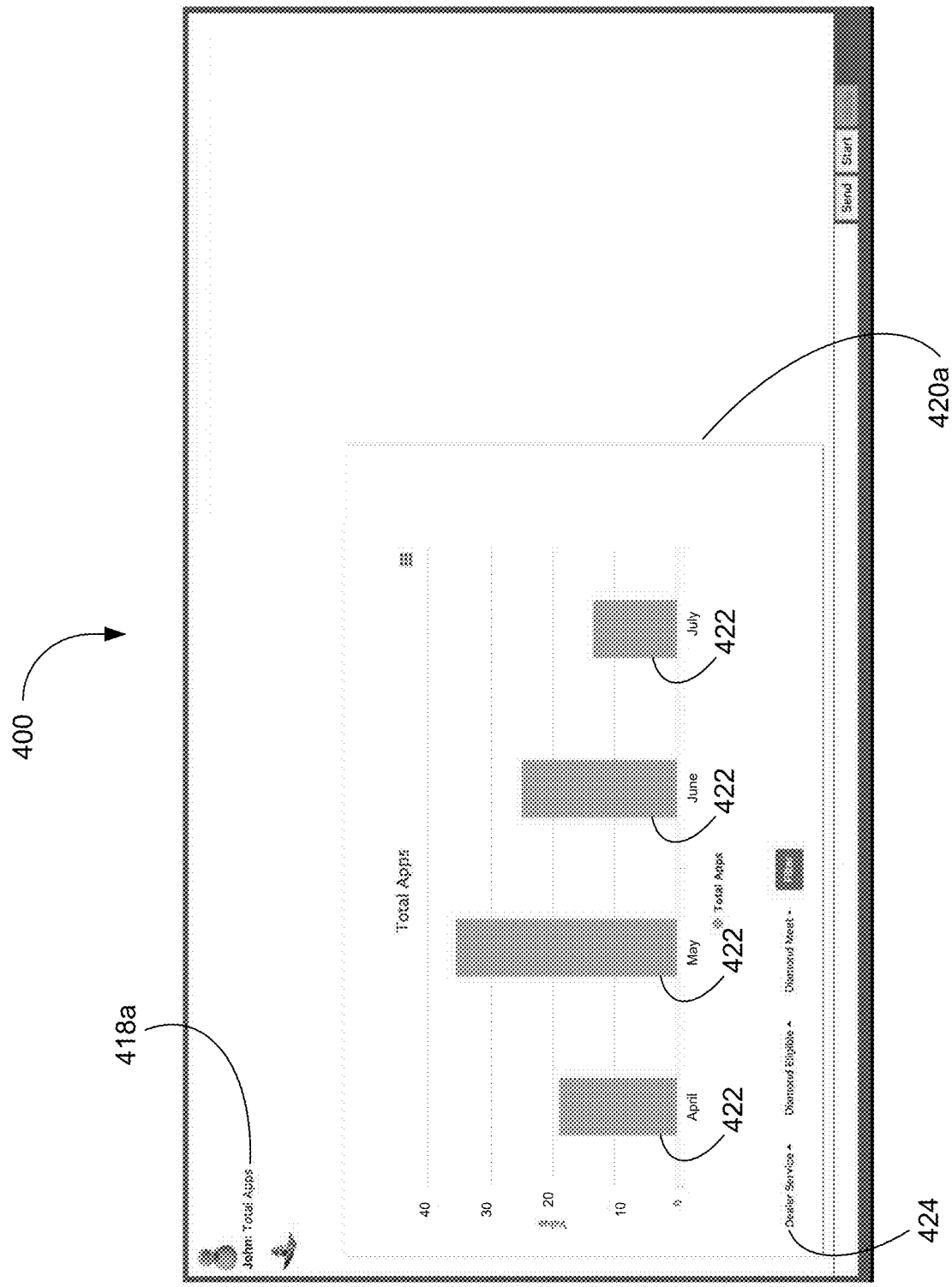

As shown in FIG. 4B, the display window 402 may be configured to display data, such as a bar chart 420a. In some embodiments, the display window 402 may be configured to present data in the form of graphs, charts, tables, pie charts, treemaps, line charts, scatter plots, area charts, steamgraphs, bubble charts, heatmaps, polar charts, pyramid charts, and the like. As will be understood by those of skill in the art, a bar chart 420a may include a plurality of bars 422, with each bar 422 representing an aggregated set of data. For example, a first bar 422 may represent the number of loan applications that were processed in a first month and a second bar 422 may represent the number of loan applications that were processed in a second month. According to some embodiments, data presented in the display window 402 may be interactive, such that, for example, if a user wanted to view details of a portion of the aggregated data (e.g., view aggregated yearly data by month), the system 200 may enable the user to manipulate the view of the data within the display window 402. According to some embodiments, the system 200 may allow a user to view details of a portion of the aggregated data by, for example, clicking on a portion of a graph, chart, or the like (e.g., selecting a bar of a bar chart, a line of a line chart, etc.) or by selecting an option from a dropdown menu 424. For example, in some embodiments, if the user is interested in viewing how many applications per week were processed in a first month, the user may be able to modify the data shown by the display window 402 to show weekly data by, for example, double clicking on a first bar 422 of the bar chart 402a. In response to receiving an indication that the first bar 422 has been selected, the CSR terminal 222 may cause the displayed bar chart 420a to change into a different bar chart showing a more detailed view of the data that was aggregated in the first bar 422, such as, for example, the application data shown on a weekly or daily basis. Further, in some embodiments, the chat user interface 400 may enable a user to view a less detailed form of the data, by, for example, aggregating bars 422 of a bar chart 402a representing monthly data into new bars that represent quarterly or yearly data.

The chat user interface 400 may be advantageous because it may quickly provide a user with relevant data that is both up-to-date and interactive, allowing the user to quickly location relevant data and interact with the data to navigate to greater or lesser detail if desired. This may be particularly useful in the context of a sales call that may last a minute or less, where the accessing the relevant data quickly and in a way that a user can comprehend, and use can be the difference between making a sale or not. The chat user interface 400 can quickly provide a user with relevant data on-demand by allowing the user to interact with the underlying systems (e.g., the automated assistant device 220, the NLP device 224) in natural language rather than through specialized commands, navigation and clicks that take extra time and may require additional training to use. In some embodiments, the chat user interface 400 provides further advantages by preemptively providing a user with data before they have requested it, such as when the system determines the identify of an incoming caller or using artificial intelligence and/or machine learning techniques to predict what information a user may find useful to view in a given context (e.g., based on listening in on a call and determining the context of the call). The chat user interface 400 may allow a user to access all of their data in a single application by continuously updating its display, whereas a user might have to navigate between different applications to access their data in other systems. The chat user interface 400 may be personalized to the user (e.g. by setting preferences or using machine learning) to allow the user to view the data that is most relevant to them, which may reduce the burden of context switching and information overload that a user might otherwise experience.

Figure 4C:
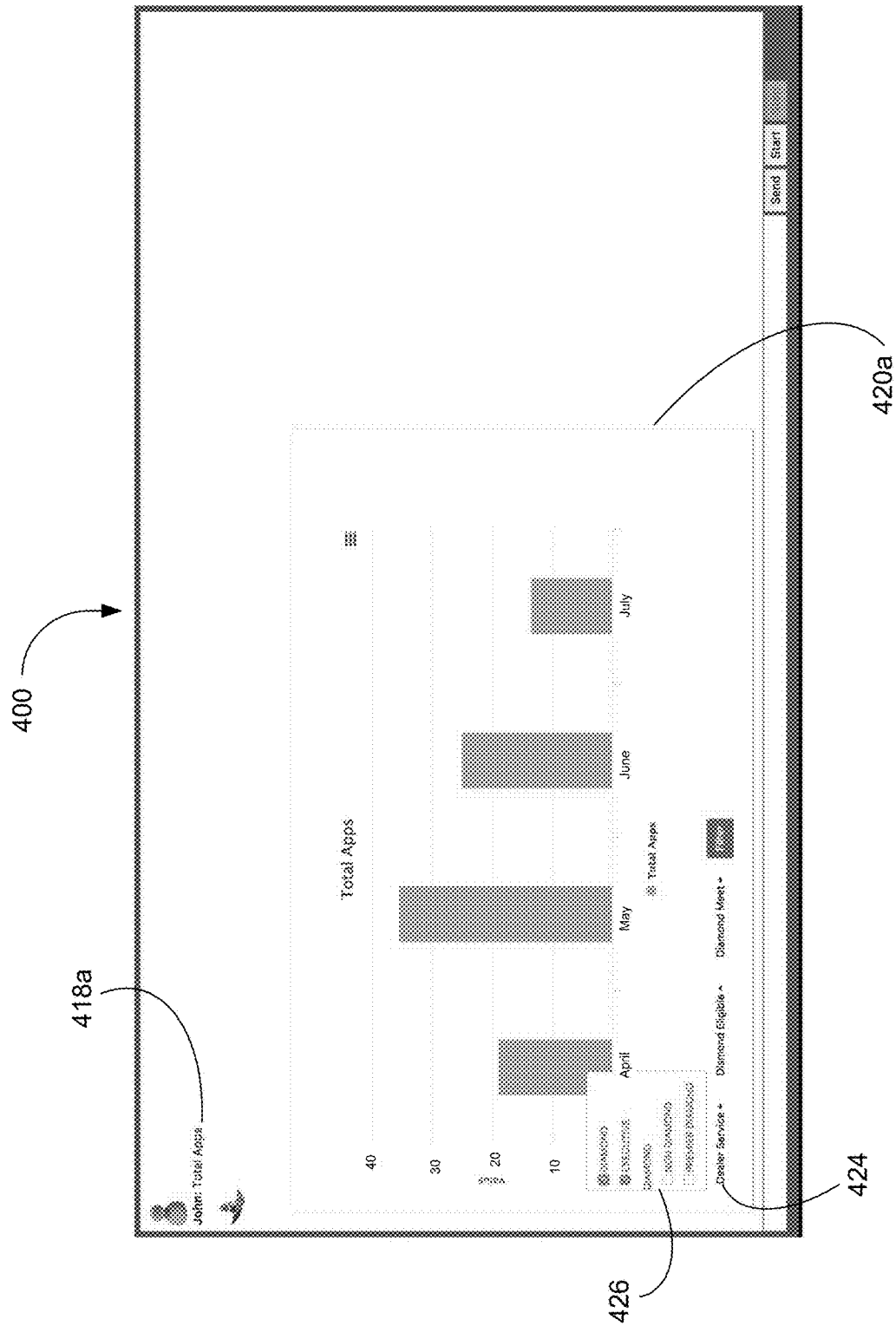
Figure 4D:
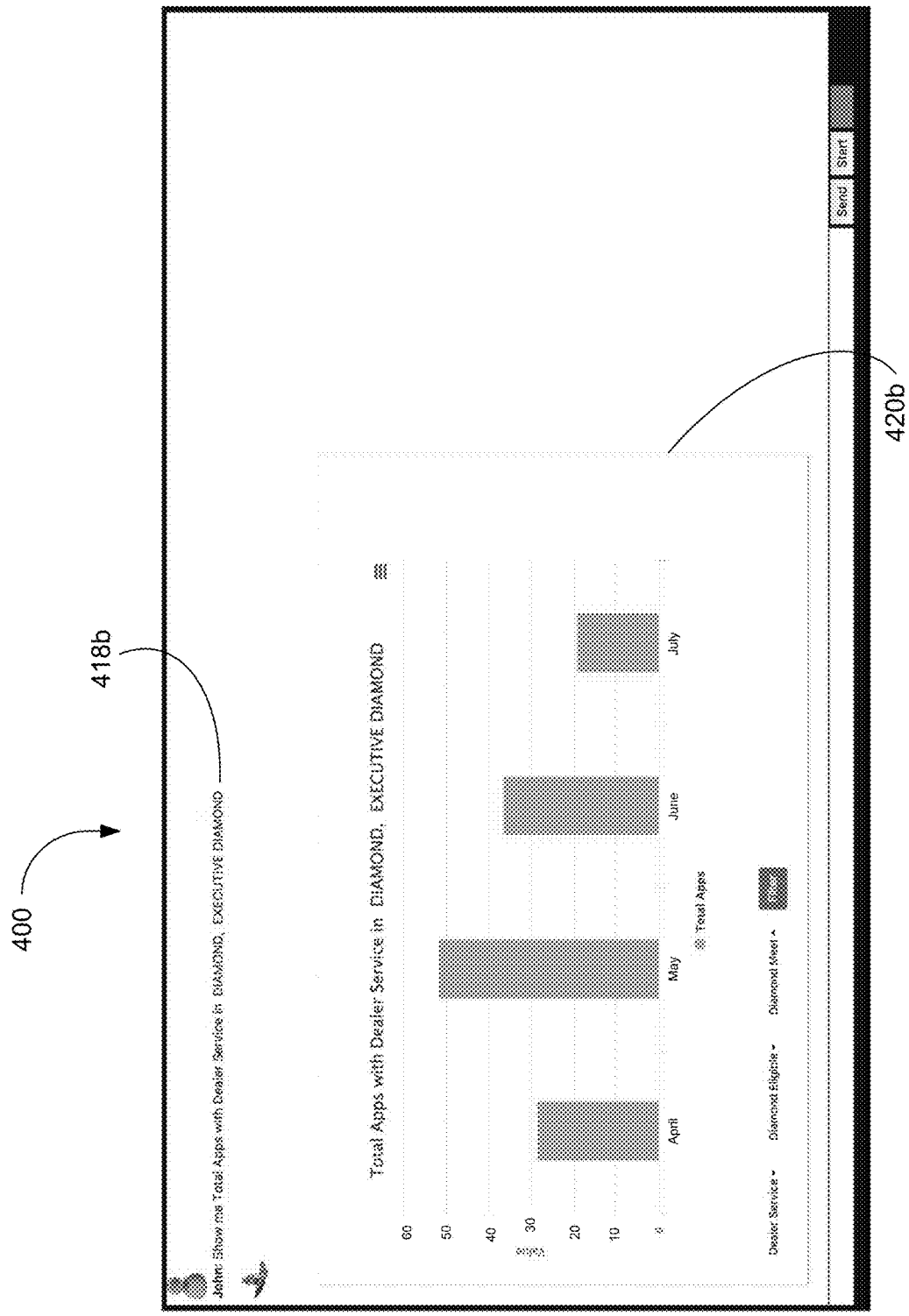

FIGS. 4C and 4D show an example embodiment of a way in which a user may interact with or manipulate the view of the real-time data presented in the bar chart 420a using the drop-down menu 424. Upon selection of the drop-down menu 424 by a user, the system 200 may display a sub-menu 426 that provides selectable options. For example, as shown in the example embodiment in FIG. 4C, selection of the "Dealer Service" the drop-down menu 424 causes a sub-menu 426 to be displayed which lists various selectable options such as "Diamond," "Executive," "Non-Diamond," and "Premier Diamond." According to some embodiments, the drop-down menus 424 and aspects of the sub-menus 426 may be selected by a user by, for example, using a mouse connected to the CSR terminal 222 to click on a button or selectable portion associated with the drop-down menu 424 or the sub-menu 426. In some embodiments, the system 200 may detect the selection of the drop-down menu 424 or one or more aspects of a sub-menu by detecting an oral statement or command from a user indicating such selections. In the example shown in FIG. 4C, the aspects "Diamond" and "Executive" have been selected from the sub-menu 426 in association with the drop-down menu 424 relating to "Dealer Service," in the bar chart 420a titled "Total Apps," which indicates that a user wishes to view the total number of applications meeting the diamond or executive classification under dealer service. In response to these selections and as shown in FIG. 4D, the system 200 generates a new bar chart 420b for display by the display window 402, showing the total number of applications with dealer service in diamond or executive diamond. According to some embodiments, the display window 402 may display a user message 418b representing the nature of the request to display the new bar chart 420b.

Figure 4E:
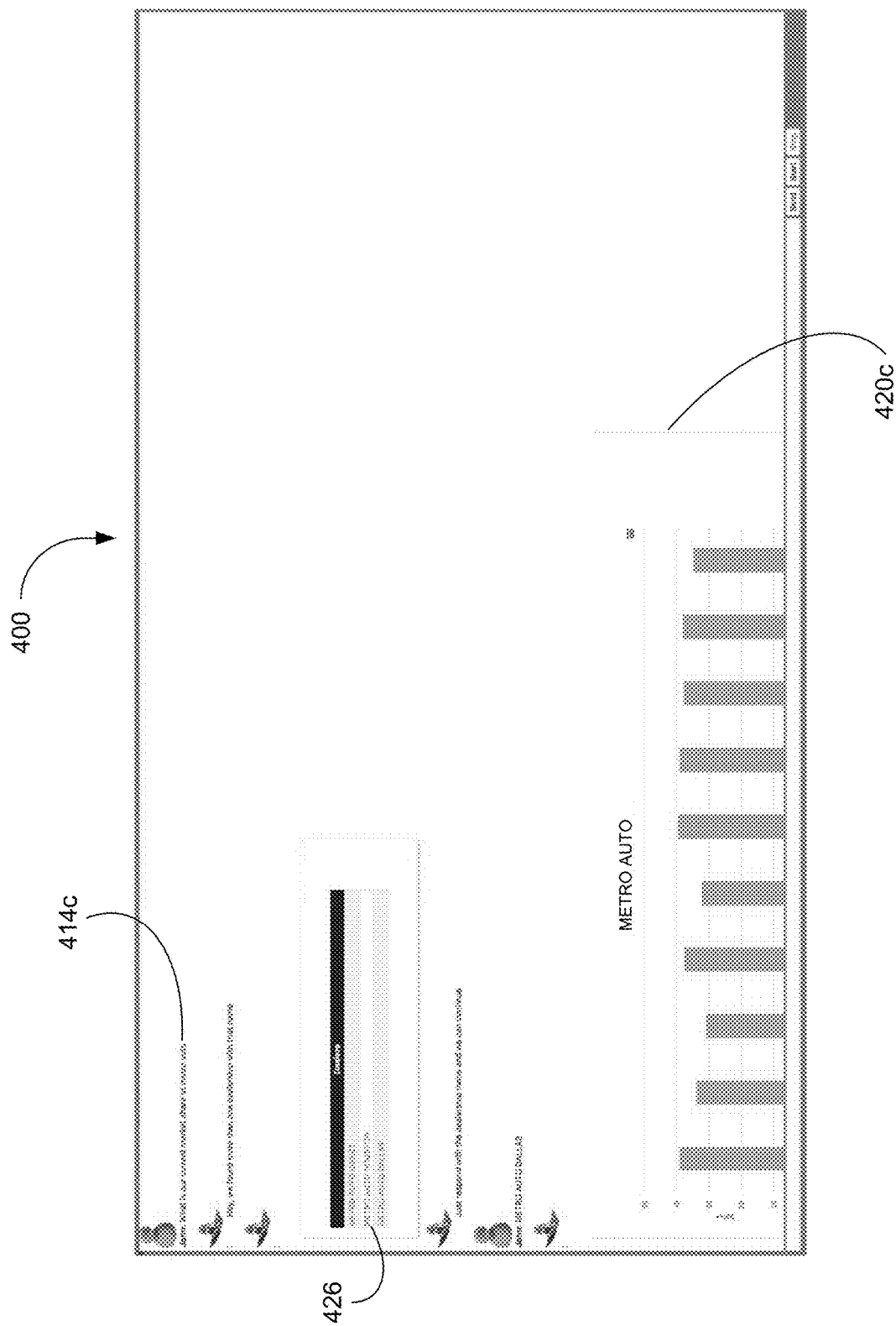

In some embodiments, user may request interactive real-time data by inputting a user message 414 that is representative of a query to the system 200 by, for example, using the input field 404 or speaking the query aloud so that it may be detected by a microphone associated with the CSR terminal 222. As shown in FIG. 4E, in an illustrative embodiment, a user may input a user message 414c to the system 200 that states "What is our current market share at metro auto." The system 200 may process the user message 414c as previously described in greater detail above (e.g., via the NLP device 224 and/or the automated assistant device 220), and may determine that there are multiple dealerships with the "metro auto name," and may provide a system message 410c providing the names of the dealerships that include "metro auto" in the name. The user may input a user message 414d in response, specifying the desired dealership, and the system 200 may then display a bar chart 420c showing data representative of the current market share of the desired dealership.

Figure 4F:
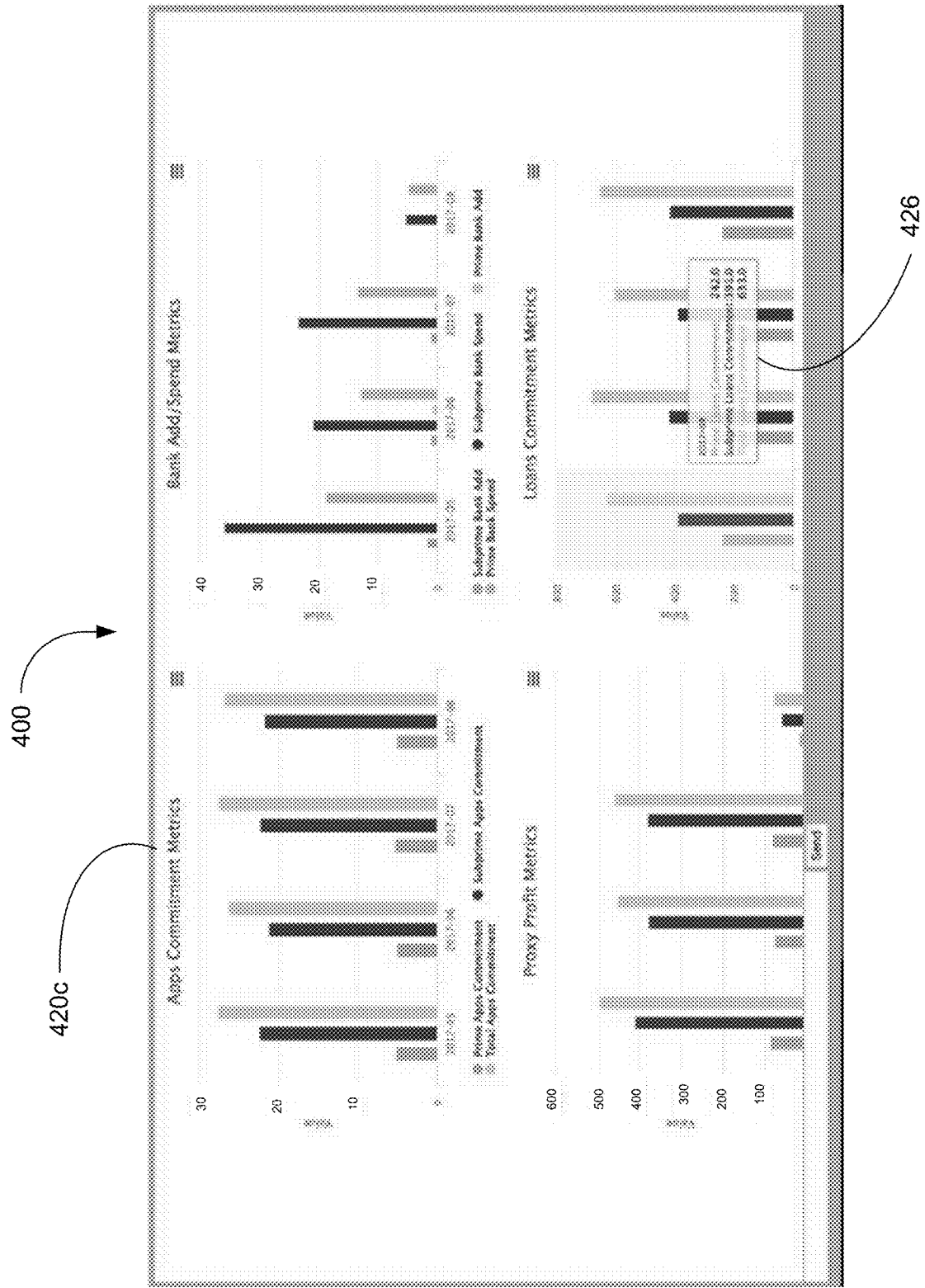

As shown in FIG. 4F, the display window 402 may be configured to display multiple charts 420d or interactive data sets at once. According to some embodiments, the display window 402 may be configured to detect a user input, such as for example, the position of a mouse pointer and/or click of a mouse and determine that a user has selected a portion of the interactive real-time data. As described above, in some embodiments, following selection of a portion of the data, the portion of the data may be expanded to show a higher level of detail or contracted to aggregate the date into a lower level of detail. As shown in FIG. 4F, in some embodiments, the system 200 (e.g., via the automated assistant 220) may cause a pop-up box 426 containing data associated with a portion of the data to pop up in response to, for example, detecting that a mouse pointer is hovering over the portion of the interactive real-time data 420c. According to some embodiments, in response to detecting a selection of a portion of the data, the system 200 (e.g., via the automated assistant 220) may present one or more selectable data manipulation options via, for example, a drop-down menu. Data manipulation options may include for example, an option to show a more or less detailed version of the data, an option to enable the user to modify the data by adding, deleting, or changing parts of the data, or the option to display related data.

Figure 4G:
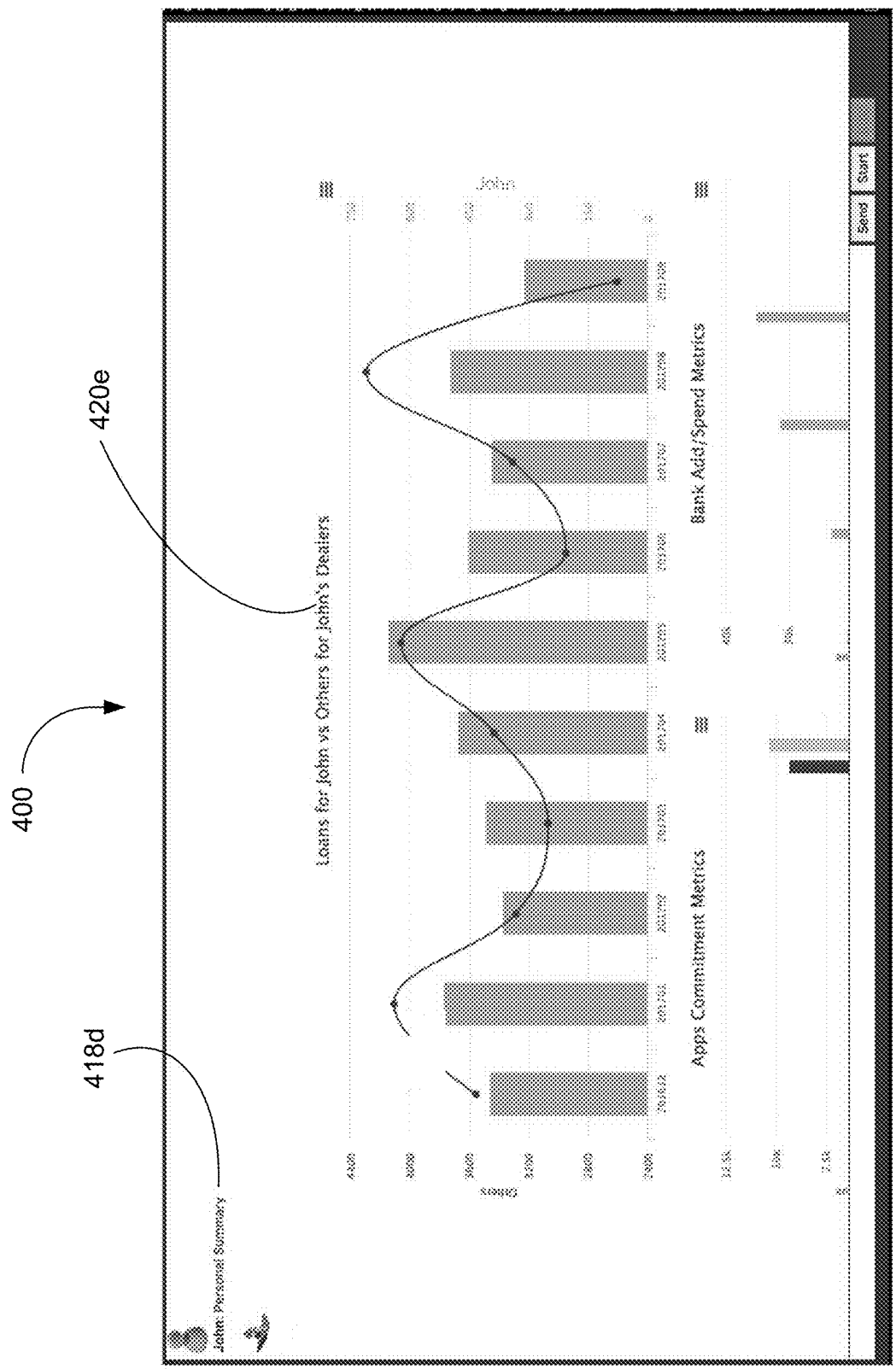

As shown in FIG. 4G, the system 200 (e.g., via the automated assistant device 220) may cause a personalized summary of data to be displayed via the display window 402. According to some embodiments, before accessing the chat user interface 400, a user of the CSR terminal 222 may be required to submit login credentials via the CSR terminal 222. Accordingly, in some embodiments, the system 200 may store a user profile that may include the user's preferences, history, and data associated with the user. Thus, if the system 200 receives a command message 418d or user request to display personalized data via a user input, then the system 200 (e.g., via the automated assistant device 220) may cause the personalized data 420e that is associated with the particular user of the CSR terminal 222 to be displayed.

Figure 4H:
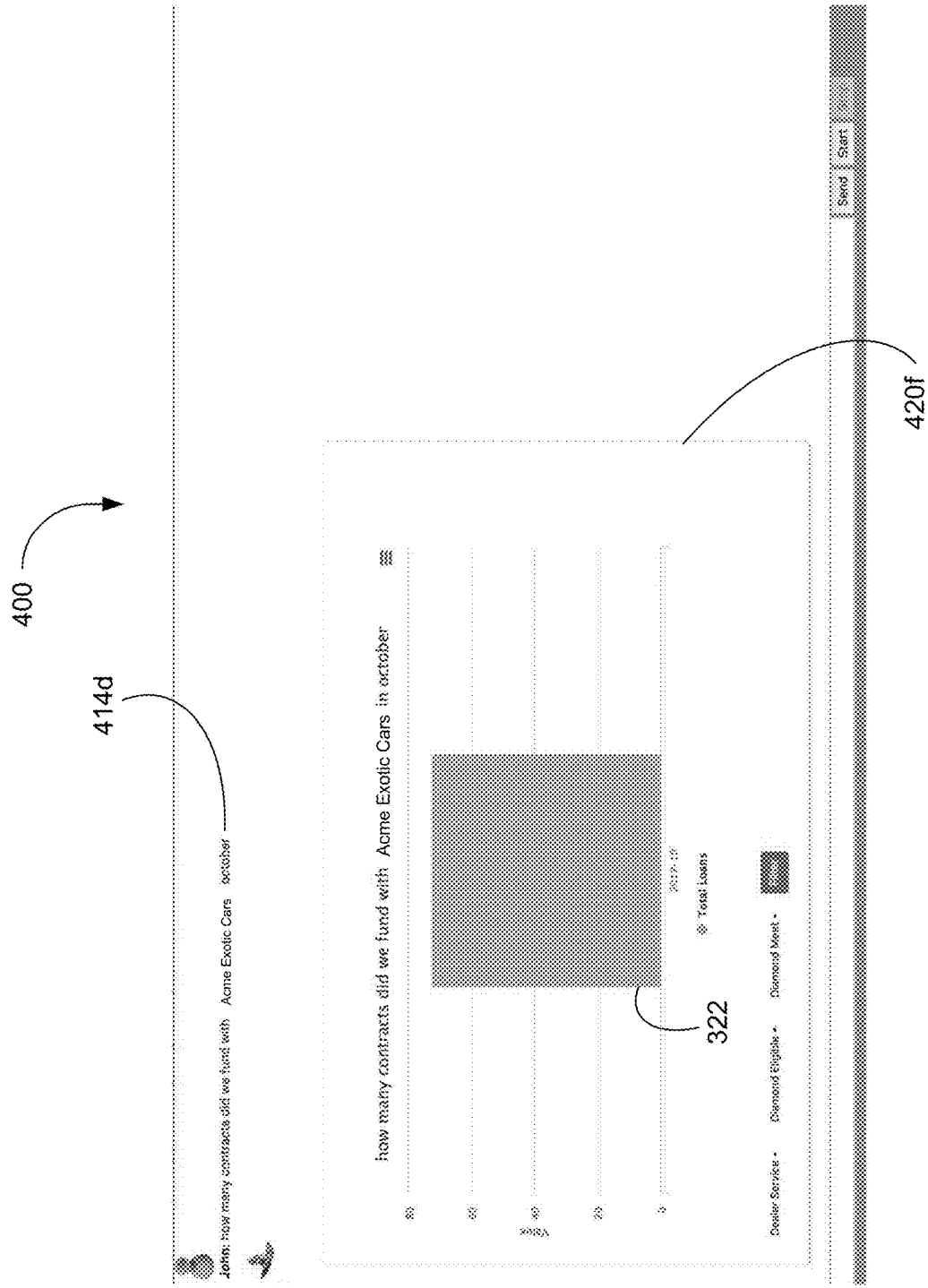
Figure 4I:
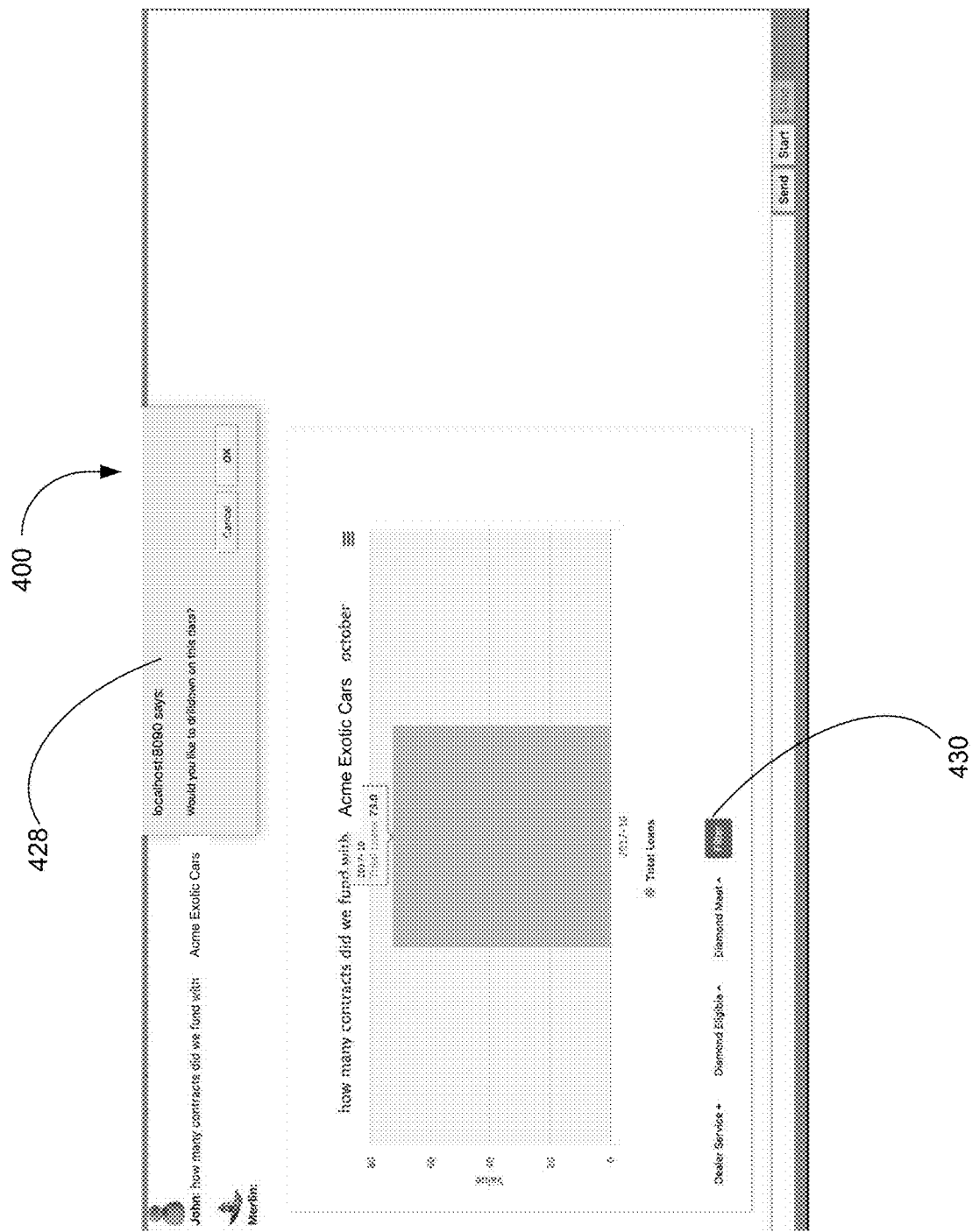
Figure 4J:
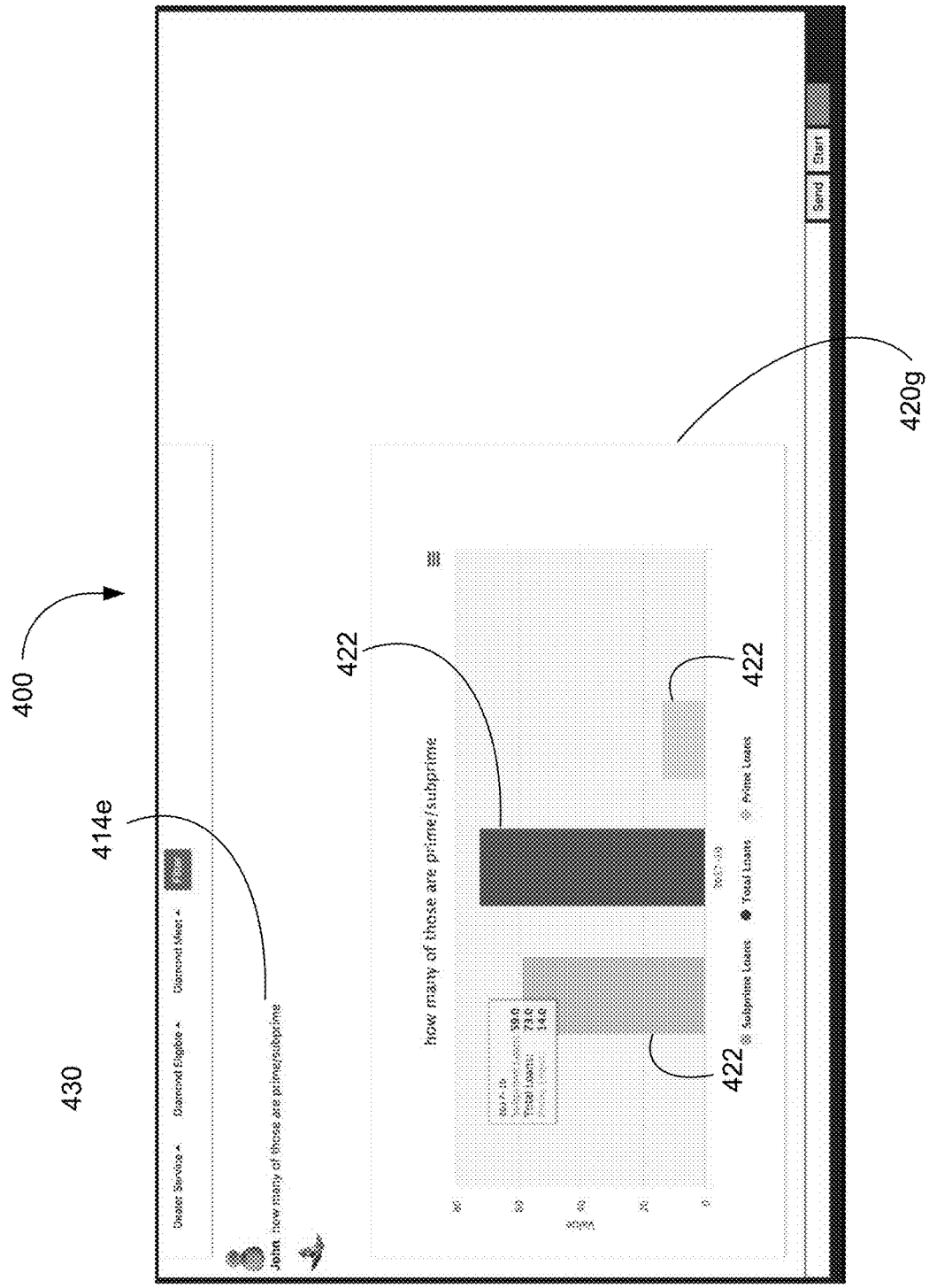
Figure 4K:
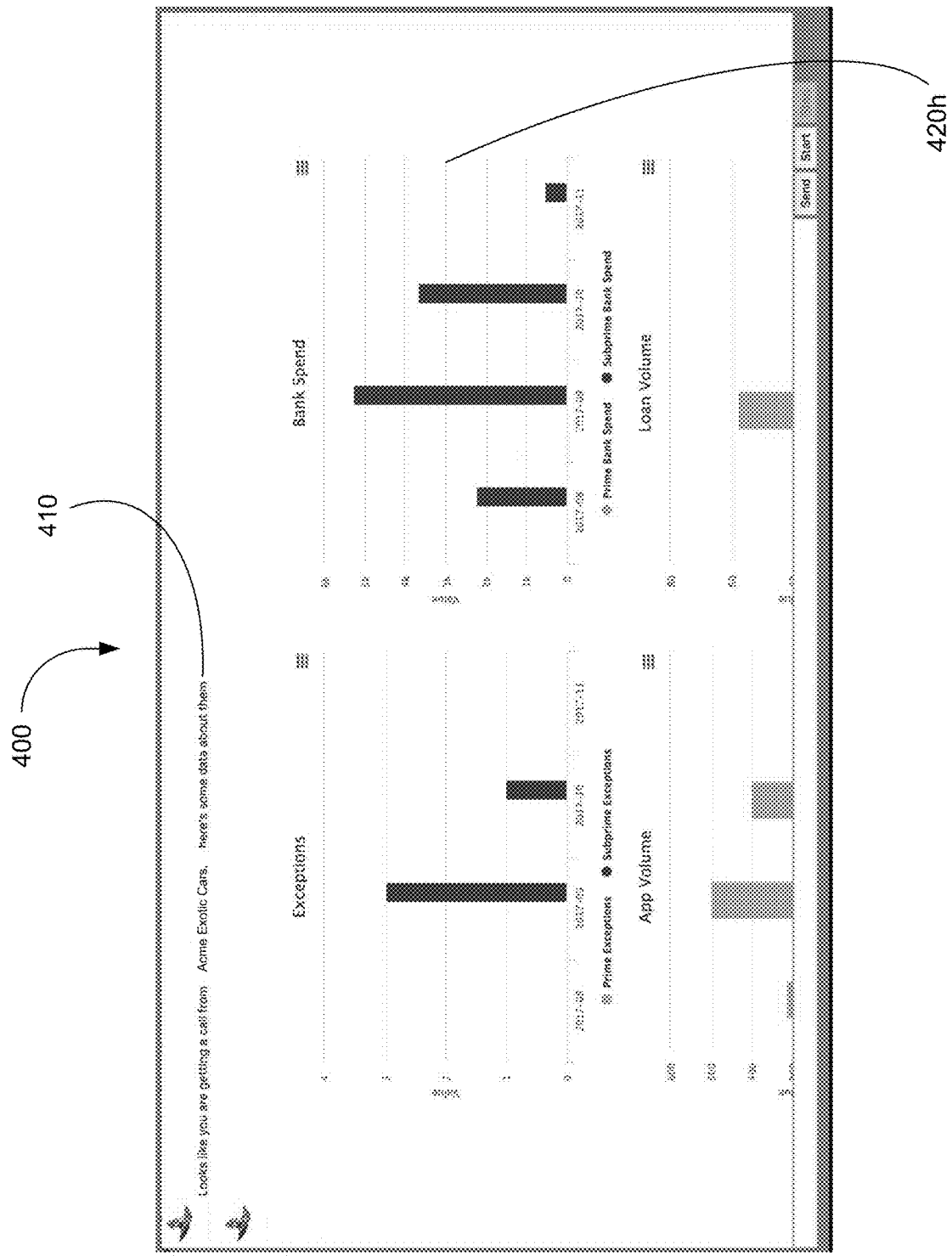

As shown in FIGS. 4H-4J, the system 200 may provide a "drill down" functionality that may allow a user to interact with data displayed in the display window 402 to show more or less detailed views of the data. In the illustrative embodiment shown in FIGS. 4H-4J, a user may input a user message 414d, stating "how many contracts did we fund with Atlantis Brand X in October" and in response to the request, the system 200 may display a bar chart 420f having one bar 422 representing the total number of loans funded with Atlantis Brand X for October of the present year. In some embodiments, the chat user interface 400 may present the user with an option of "drilling down" on the data shown in the bar chart 420f, by for example, displaying a popup box 438 asking the user whether they would like to drill down on the data, as shown in FIG. 4I. According to some embodiments, the chat user interface 400 may present an option to "drill down" in response to, for example, a user clicking on the bar 422 of the bar chart 420f, a user input typed into the input field 404, a statement spoken by the user, or in response to selection of a "filter" button 430. In some embodiments, the system 200 may not present an option to drill down, but may simply proceed with drilling down on the selected data in response to such a user input. According to some embodiments, after indicating a desire to drill down on the data, the system 200 may receive an indication of how the user wants to drill down. For example, as shown in FIG. 4J, a user may input a user message 414e representative of a desire to know how many of the contracts are prime and how many are subprime. In response to the request to drill down, the system 200 may generate a detailed chart 420g, that shows the data that was aggregated into one bar 422 in the chart 420f split into three bars 422 that show the number of subprime loans, the number of total loans, and the number of prime loans, respectively. According to some embodiments, the system 200 may generate a detailed chart in response to an indication of a user's request to drill down on the data without requiring the user to specify how the user wants to drill down. For example, the system 200 may include some predetermined automatic drill down commands such as for example, a predetermined drill down command that automatically generates a new chart showing subprime loans and prime loans when a bar of a bar chart showing total contracts is clicked on by a user. It will be appreciated that the foregoing are merely examples and that many different types of predetermined drill down commands may be used in various embodiments and that a user may customize predetermined drill down commands to show the type of data they desire to see in response to, for example, clicking on a bar of a bar chart.

In addition to the "drill down" functionality, the system 200 may also provide various other useful functionalities that may serve to aid a salesperson on a sales call by saving the salesperson time. For example, as described in greater detail below, the system 200 may provide an autocomplete functionality that may generate suggested completions to partial text statements entered into the input field 404. According to some embodiments, the system 200 may provide an autocomplete function that may suggest the completion of information that is stored in association with a field of a database, such as, for example, a metric name, a dealer ID, a dealer name, an area sales manager ("ASM") name, a relationship manager ("RM") name, or an application ID. Examples of metric names or metrics may include, for example, total applications, prime applications, subprime applications, proxy profit, bank spend, bank add, total loans, prime loans, subprime loans, prime applications commitment, subprime applications commitment, and the like. The system 200 may provide a "notes tracking" functionality that may allow a user of the CSR terminal 222 to input notes regarding sales or other business activities during a day. In some embodiments, the chat user interface 400 may receive notes via an input field, such as the input field 404, in which a user may input text to be saved by, for example the database 218, for future access. For example, in some embodiments, a user may enter "Add Note Application needs review by supervisor to app id #1234567" in the input field 404 to enter a note that is associated with application number 1234567 and indicates that the application needs to be reviewed by a supervisor. Thus, the system 200 may provide a user with a quick and convenient way to add notes to an application or file without utilizing a different program or separate interface. As described in further detail below, the system 200 may include a voice activation or voice-to-text functionality that may detect words spoken during an incoming phone call and retrieve pertinent data based on the words being spoken. For example, if a salesperson using the system 200 is speaking with a car dealership via an incoming call, the system 200 may listen to the call and retrieve, for example, pertinent dealership information or loan application information. Such voice-activation may allow a user to access the chat user interface 400 on the go. For example, a user may access the chat user interface 400 via a user device 202, such as a mobile phone, to assist with taking a sales call when the user is driving for example. Further, as shown by the illustrative example in FIG. 4K, the system 200 may determine the identity of an incoming caller based on caller ID information and may automatically display information relating to the incoming caller. For example, if the incoming caller is a car dealership, the system (e.g., via the CSR terminal 222) may automatically display a profile of the dealership, loan applications in process for the dealership, and/or information regarding known issues or problems with loan applications, so that a salesperson may be immediately ready to address the concerns of the dealership upon answering the call. As shown in the example in FIG. 4K, upon identifying the incoming caller, the chat user interface 400 may display the system message 410 that identifies the incoming caller and may further display one or more interactive real-time charts 420h associated with the identified incoming caller. The system 200 may further include a real-time reporting functionality that may automatically update metrics (e.g., total applications, prime applications, subprime applications, etc.) in response to certain real-world actions. For example, a correction to a loan application may affect a salesperson's metrics. For example, a salesperson may reach an agreement on the terms of a loan application with a dealership and having completed their job, the salesperson may forward the loan application to a funding department, which may find discrepancies in the loan application, such as a missing income statement, a mismatched social security number, or the like, and the loan application may be rejected or sent back to the salesperson to make revisions. Thus, it is possible that even after having completed their task, a salesperson's metrics may need to be adjusted. Such events and/or corrections may traditionally not be reflected in the data until the next day, but the system 200 may capture the event (i.e., the discrepancy in the loan application) in real time and automatically update the data to provide salespeople with a more accurate view of the data when attempting to make sales. Further, as described in greater detail below, the system 200 may provide a monitoring and alert functionality that may allow users to set up alerts that may trigger when specified conditions are met.

Figure 5:
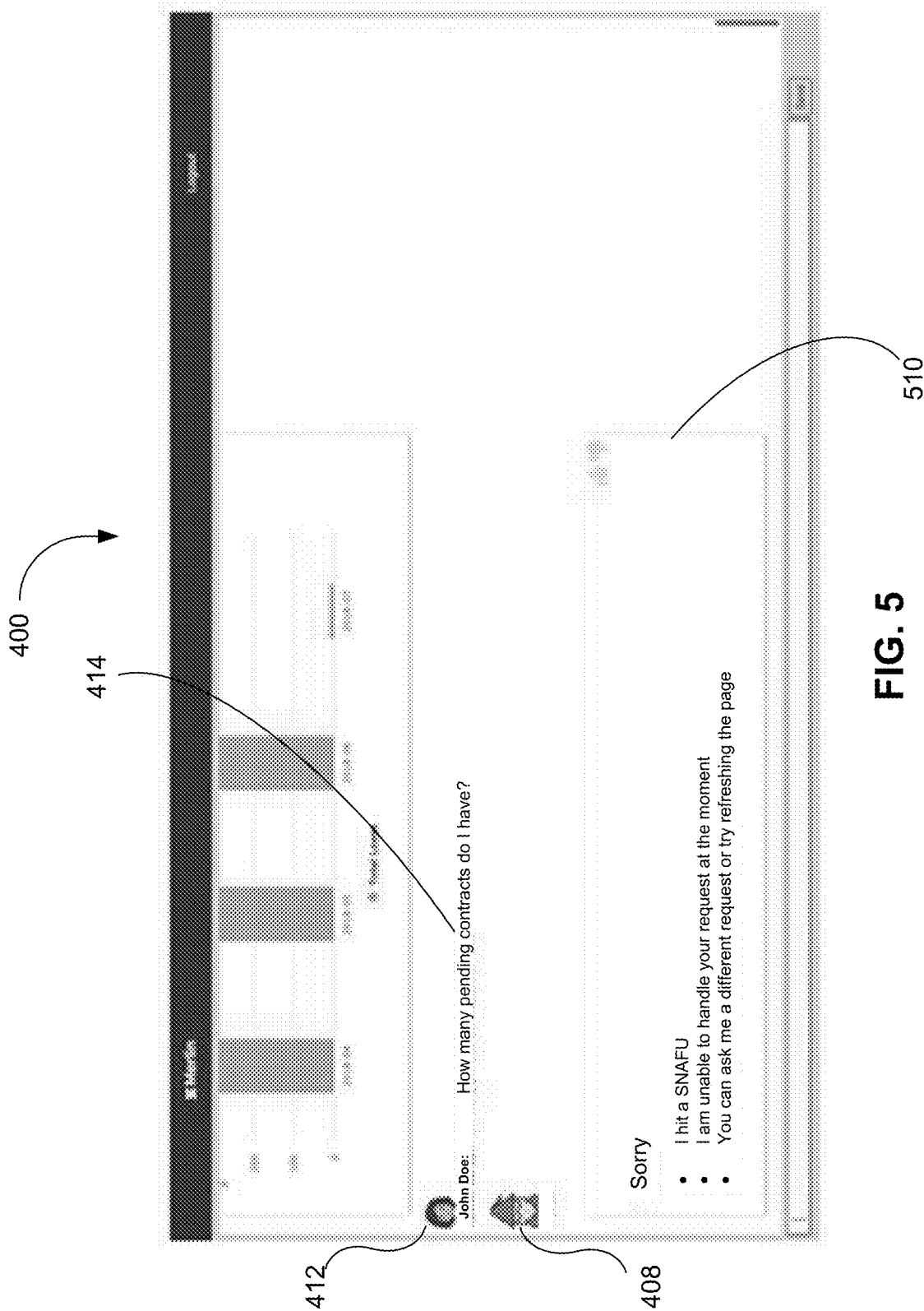
FIG. 5 is an example of an automated assistant wherein the natural language request cannot be processed, in accordance with some examples of the present disclosure.

As shown in FIG. 5, when a user message 414 is input to the chat interface 400 that is unable to be processed by the system 200 (e.g., via the NLP device 224), the system 200 (e.g., via the automated assistant device 220) can cause an error message 510 to be displayed in the chat interface 400 to indicate that the request could not be processed. In some embodiments, the user message 414 can comprise a first text. According to some embodiments, the error message 510 can be displayed by the system 200 when the NLP device 224 (comprising two or more trained named entity recognition models) does not produce pseudo labels to the entities in the first text when the two or more trained named entity recognition models are not in agreement. For instance, a model may take the phrase "how" as the query and the phrase "many pended contracts" as the item, whereas another model may take the phrase "how many" as the query and the phrase "pended contracts" (correctly) as the item. Since the models are not in agreement, the error message 510 is displayed by the system 200. According to some embodiments, the user message 414 comprising the first text can then be stored (i.e. at a database 218) and flagged for review. Upon displaying the error message 510, the system 200 can include a number of options to the user of the chat interface 400. For example, the user may be prompted to input another user message 414 or may be prompted to enter a reviewing user interface. According to some embodiments, the user may be prompted to wait or refresh the page while the two or more trained named entity recognition models further analyze is user message 414. The system 200 may provide these prompts to the user through the chat interface 400 or, in some embodiments, may directly display the reviewing user interface in the chat interface 400. Further, as described below in greater detail, the user message 414 comprising the first text can be provided at the NLP device 224 for further analysis.

Figure 6:
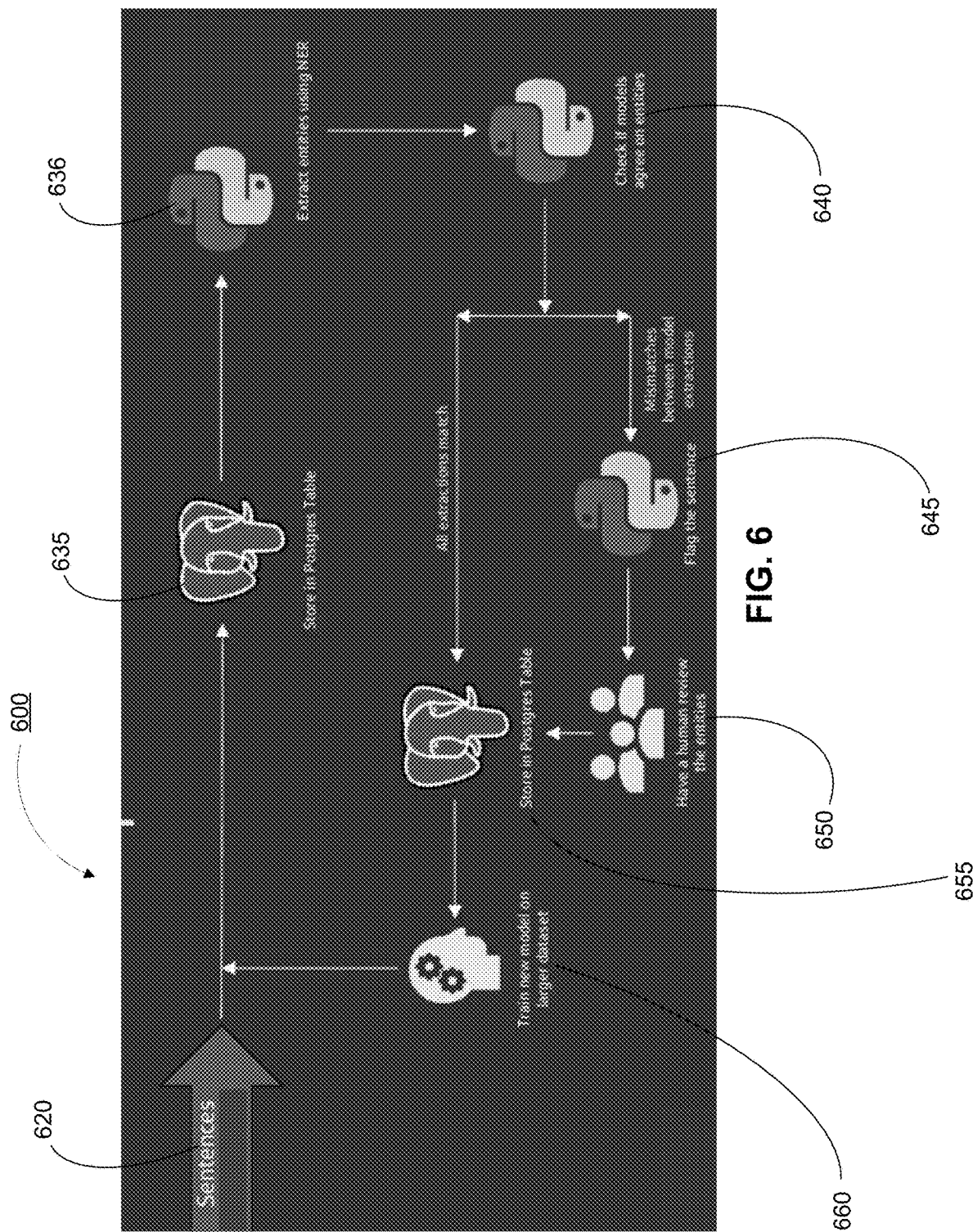
FIG. 6 is a flowchart of an example of a method for training an automated assistant for display via a chat user interface, in accordance with some examples of the present disclosure.

FIG. 6 illustrates a flowchart of a method 600 for training an untrained named entity recognition model. The method 600 may be performed by a system including some or all of a web server 210, a call center server 212, a transaction server 214, a database 218, an automated assistant device 220, a CSR terminal 222, an NLP device 224, a user device 202, and a merchant server 226. The system can provide two or more named entity recognition models for natural language processing. For example, the NLP device 224 can comprise two or more named entity recognition models. In block 620, the system (e.g., the NLP device 224) can receive unlabeled natural language requests from an automated assistant device 220. In some embodiments, the entries to the automated assistant device 220 can be stored in a database 218 as shown in block 635. The unlabeled entries can then be pseudo labeled using the two or more trained named entity recognition models. For instance, the pseudo labels "dealer," "item," and "date" can be applied to "Acme Exotic Cars," "contracts," and "October," respectively. In some embodiments, the NLP device 224 can determine whether or not the pseudo labels applied by each of the two or more trained named entity recognition models match, as shown in block 640. For example, if all models apply the label "item" to the entity "contracts," then the models are taken to agree. In this instance, the pseudo labels are taken to be true and associated with the first text to create a labeled data set, as shown in block 655. The labeled data set can then be used to train an untrained model or to further train the two or more trained models, as shown in block 660. However, if most models apply the label "item" to the entity "contracts," but one model mistakenly applies the label to "many contracts," then the models are taken to be not in agreement. In this instance, a flag can be applied to the first text to indicate that review is needed, as shown in block 645. As shown in block 650, the system (e.g., the NLP device 224) can provide a method for reviewing the mismatched pseudo labels. In some embodiments, the first text, pseudo labels, and corresponding entities can be provided back to the user via the UI. In some embodiments, the first text, pseudo labels, and corresponding entities can be provided to a review via a reviewing UI. Upon receiving corrected entities for the pseudo labels, the NLP device 224 can provide the first text and labels to a databased 218 as an entry to a labeled data set.

FIG. 7 shows an embodiment of a reviewing User Interface (UI). As shown, the reviewing UI can provide the first text, pseudo labels, and corresponding entities from the NLP device 224 to a reviewer using the reviewing UI. For example, the first text can comprise the natural language request, "total market share Tri-State Motorcars may." As shown, the NLP device 224 can apply the pseudo labels of "DEALER" to "Tri-State Motorcars", "METRIC" to "total market share", and "DATE" to none. Since the pseudo label of "DATE" is not applied to a named entity, the first text has been flagged for review and provided to a review via the reviewing UI. As shown, the reviewer can validate and confirm the pseudo labels which have already been applied and correct the mislabeled named entities or provide named entities to pseudo labels which have not been applied. In some embodiments, the corrected pseudo labels and first text can be stored in a database 218 as an entry to a labeled training data set by the NLP device 224. The labeled data set can then be used to further train the two or more named entity recognition models in the NLP device 224, or to train an untrained named entity recognition model. Such an embodiment would provide for an adaptive chat assistant 220 which can continually learn and train from errors.

Figure 8:
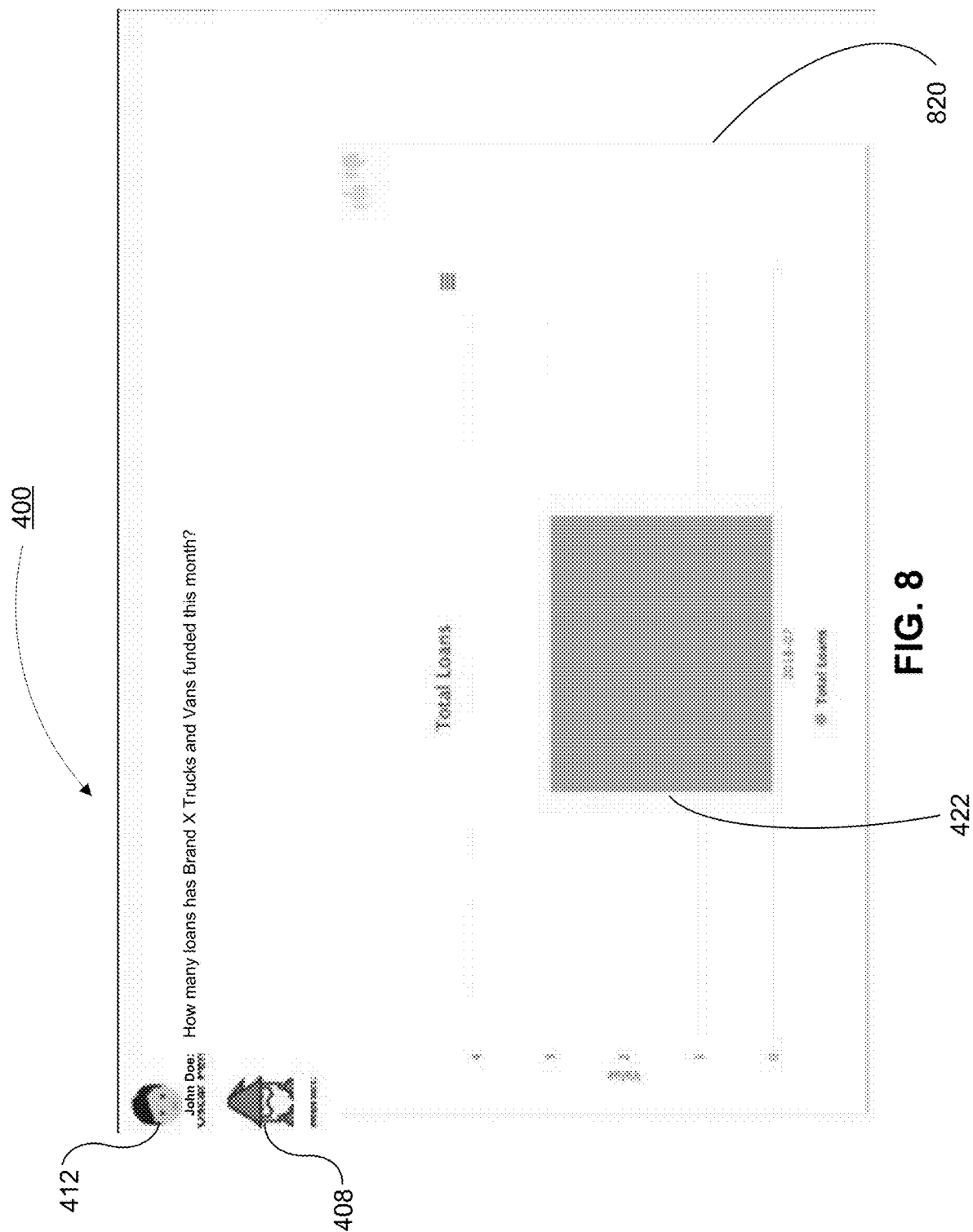
FIG. 8 is an example of an automated assistant wherein the natural language request has been processed by corrected pseudo labels, in accordance with some examples of the present disclosure.

As shown in FIG. 8, after utilizing the training process, the automated assistant 220 is able to learn from the labeled data set and provide a response 820 comprising the correct interactive data 422 to the user of the chat interface 400. In some embodiments, the NLP device 224 can constantly train the two or more named entity recognition models using the presently disclosed methods such that the automated assistant 220 performance improves over time. As would be appreciated, in such an embodiment, the potential growth of the labeled data set is only limited by the amount of entries into the automated assistant 220.

Further, in some embodiments, the system 200 may provide a recommendation function that may utilize artificial intelligence and/or machine learning techniques to provide recommendations to a user of the system 200 on which future tasks to perform next, based on the priority or importance of the task. In some embodiments, the system 200 (e.g., automated assistant device) may access different sources of data, such as internal databases or external data (e.g., weather data, foot traffic data) accessed via one or more APIs and to run various supervised and unsupervised machine learning models on the data to identify causal or correlated relationships between data sets and trends. For example, such machine learning models may determine that there is a decrease in expected loan applications at a dealership when the weather meets certain conditions. Insights provided by the machine learning models may be presented as actionable items in an intelligent recommendation queue to a user of the chat user interface 400. As will be appreciated by those of skill in the art, the system 200 (e.g. via the automated assistant device) may generate tasks/recommendations based on the machine learning models, which may be updated at regular intervals (e.g., monthly) and based on real-time events and conditions. For example, if, based on a machine learning model, the system 200 predicts that under current conditions, a financial organization should close 50 loan applications per month with a particular dealership, but if the real-time data indicates that the organization is only on pace for closing 30 loan applications with that dealership in the current month, the system 200 may generate a recommendation to a salesperson to increase their sales efforts with that dealership and place the recommendation in the recommendation queue.

Thus, according to some embodiments, the system 200 may include an artificial intelligence-based task queue (e.g., managed by the automated assistant device 220) for storing recommendations for display to a user of the chat user interface 400. In other words, the system 200 may utilize artificial intelligence techniques to fill a recommendation queue with tasks that represent recommendations for actions to be taken by a user of the system 200. For example, based on historical data, the system 200 may know that if a particular dealership has a sales event, then the entity associated with the organization 208 will typically close 100 loans a month with that dealership. If the system 200 knows that the dealership is currently having a sales event this month, but the entity associated with the organization 208 is not on pace to reach the expected 100 loans, the system 200 may create a task and place it in the task queue. The task may represent a recommendation for a user to call the dealership to attempt to make sales of loans. In some embodiments, the system 200 may display a recommendation to a user of system 200 based on one or more tasks in the task queue. For example, in some embodiments, a user may input a user message such as "What should I do next?" into the input field 404 and upon submitting the user message, the automated assistant device 220 may process the user message and respond by displaying one or more recommended actions from the recommendation queue in the display window 402. In some embodiments, the system 200 may assign a priority to each task/recommendation in the recommendation queue based on predetermined rules, weights or values that are, for example, input by a user. For example, predetermined rules may indicate that closing a loan with dealership A is more highly valued than closing a loan with dealership B, and thus the system 200 may more highly prioritize the processing of a loan application for dealership A over dealership B. According to some embodiments, tasks may be ordered in the recommendation queue based on their assigned priority. In some embodiments, the chat user interface 400 may include a window that displays the recommendation list so that a user can always view one or more of the highest priority recommended tasks. In some embodiments, the system 200 (e.g., via the automated assistant device 220) may determine that a user has performed a task by monitoring calls made by the user via the web server 210 to determine, for example, that a salesperson has called a particular dealership. In some embodiments, the system 200 may determine that a user has performed a particular task by monitoring information input into the chat user interface 400 that satisfies the task, such as for example, processing a particular loan application. After determining that a task has been performed by the user, automated assistant device may remove the task from the queue and/or reorder the priority of the task to place it lower in the queue.

While the web server 210, the call center server 212, the transaction server 214, the automated assistant device 220, the CSR terminal 222, the NLP device 224, and the merchant server 226 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 210, the call center server 212, the transaction server 214, the automated assistant device 220, the CSR terminal 222, the NLP device 224, or the merchant server 226 may include a greater or lesser number of components than those illustrated. Further, although the embodiments above generally describe display of the chat user interface 400 on the CSR terminal 222, it should be appreciated that the chat user interface 400 may be displayed by the user device 202, such as a smartphone, and that a customer service representative may access the system 200 remotely via a mobile device.

Figure 9:
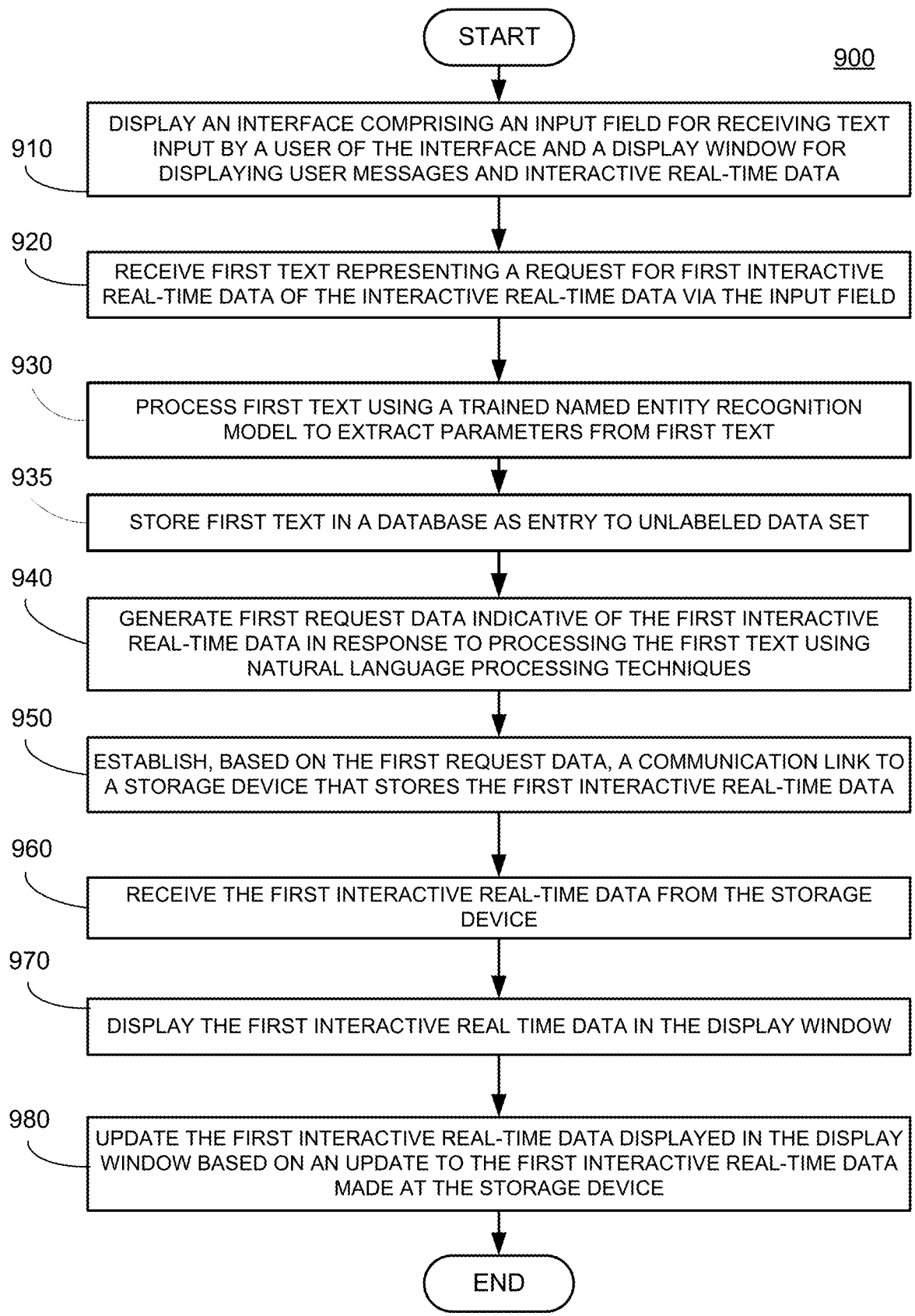
FIG. 9 is a flowchart of an example of a method for providing interactive data via an automated assistant within a chat user interface, in accordance with some examples of the present disclosure.

FIG. 9 shows a flowchart of a method 900 for providing interactive data in real time via an automated assistant. The interactive data is provided within a user interface, which in some embodiments may be within a chat user interface. The method 900 may be performed by a system including some or all of a web server 210, a call center server 212, a transaction server 214, a database 218, an automated assistant device 220, a CSR terminal 222, an NLP device 224, a user device 202, and a merchant server 226.

In block 910, the system (e.g., via an electronic display of CSR terminal 222) may display the chat user interface 400 comprising the input field 404 for receiving text input by a user of the chat user interface 400 and the display window 402 for displaying user messages and interactive real-time data. According to some embodiments, user messages may be generated via the received text input. For example, a user of the CSR terminal 222 may input text into the input field 404 and select a "Send" button 406 to generate a user message. According to some embodiments, the display window 402 may be configured to display system messages that are automatically generated by a computing system. For example, system messages may be automatically generated by, for example, the automated assistant device 220 and/or the NLP device 224. Likewise, the display window 402 may display interactive real-time data in the form of, for example, bar charts, line graphs, tables, pie charts, treemaps, line charts, scatter plots, area charts, steamgraphs, bubble charts, heatmaps, polar charts, pyramid charts, and the like. In some embodiments, the system (e.g., via the web server 210) may receive caller ID information associated with an incoming phone and determine, based on the caller ID information, the identity of a merchant associated with the incoming phone call. For example, the web server 210 may identity that a particular car dealership is calling a salesperson associated with an entity, such as a financial services provider, that is associated with the organization 208. The system (e.g., via the CSR terminal 222) may display merchant information via the display window 402 based on the identity of the merchant. For example, the display window 402 may automatically display the name of the incoming caller or business and current or past sales data relating to the incoming caller. In some embodiments, the chat user interface 400 may be initiated, loaded, and/or displayed in response to detecting an incoming call and identifying the incoming caller. According to some embodiments, the identity of the incoming caller may be received by the automated assistant device 220 and/or the NLP device 224 to be used in determinations of the meanings of customer messages and the determination of which data may be displayed at the CSR terminal 222 in response to user requests.

In block 920, the system (e.g. the automated assistant device 220) may receive, via the input filed 404, first text representing a request for first interactive real-time data of the interactive real-time data. For example, a user may type and submit a user message via the input field 404 that says "show me total applications" to request data representing the total number of loan applications over a particular time period. According to some embodiments, the CSR terminal 222 may transmit the user message to the automated assistant device 220 and/or the NLP device 224 for processing. According to some embodiments, in addition to typing text into the input field 404, text may also be entered in response to detection of orally spoken words. For example, in some embodiments, an audio sensor in communication with the system 200 may detect words spoken by the user of the chat user interface 400 and may automatically enter text representative of one or more of the words spoken by the user into the input field 404 in response to performing a voice-to-text analysis (e.g., via the automated assistant device 220).

In block 930, the system (e.g. the automated assistant device 220) may generate first request data indicative of the first interactive real-time data in response to processing the first text using natural language techniques. For example, the NLP device 224 may receive a user message that says "show me total applications" and using natural language processing techniques, the NLP device 224 may generate request data that represents a request for data pertaining to the total number of loan applications processed for a particular dealership over a specified period of time, such as, for example, all loan applications for a particular Brand X dealership over the past year. In some embodiments, the dealership may be identified by the automated assistant device 220 based on previous user messages submitted during the conversation or by identifying the dealership from caller ID information associated with an incoming call. According to some embodiments, the NLP device 224 may transmit the request data to the automated assistant device 220 for execution of the request. In some embodiments, the NLP device 224 may comprise two or more trained named entity recognition models. The models can process the first text by applying pseudo labels to the named entities and determining if the two or more models have matching named entities to the corresponding pseudo labels. Upon determining the named entities match, the NLP device 224 can provide the automated assistant device 220 a generated data response based on the processed entry. In some embodiments, upon determining the named entities match, the NLP device 224 can store (e.g. in a database 218) the first text entry and applied pseudo labels with corresponding named entities to a labeled training data set. In some embodiments, the NLP device 224 can store (e.g. in a database 218) the first text entry in an unlabeled data set. The unlabeled data set can then later be used for training and labeling.

In block 935, the system (e.g. the automated assistant device 220) may store the first text in a database as an entry to an unlabeled data set. For example, the NLP device 224 can transmit the first text to a database 218. In some embodiments, the unlabeled data set can later be processed by two or more named entity recognition models to generate labeled training data.

In block 940, the system (e.g. the automated assistant device 220) may establish a communication link to a storage device (e.g., the database 218) that stores the first interactive real-time data. In some embodiments, establishing a communication link may be based on the first request data. For example, the automated assistant device 220 may receive request data from the NLP device 224, wherein the request data represents a request for, for example, all loan applications for a particular Brand X dealership over the past year, and the automated assistant device 220 may establish a communication link to, for example, the database 218 that stores the loan application data for the particular Brand X dealership. In some embodiments, the automated assistant device 220 may establish a link between the storage device that stores the requested data and the CSR device 222 that displays the data via the chat user interface 300.

In block 950, the system (e.g. the automated assistant device 220) may receive the first interactive real-time data from the storage device. For example, in some embodiments, the automated assistant device 220 may receive the first interactive real-time data from the storage device. In some embodiments, the CSR terminal 222 may receive the first interactive real time data from the storage device.

In block 960, the system (e.g. the CSR terminal 222) may display the first interactive real-time data in the display window 402. For example, the display window 402 may display the first interactive real-time data as an interactive chart, graph, table, or other such common data format that represents the requested first interactive real-time data. In some embodiments, one or more portions of the displayed first interactive real-time data may be selected or manipulated as described previously in this disclosure to, for example, view more or less detail of the represented data, view other associated data, or input, add, or delete data.

In block 970, the system (e.g. the automated assistant device 220) may update the first interactive data real-time data displayed in the display window 402 based on an update to the first interactive real-time data made at the storage device. For example, if the first interactive real-time data is a chart showing the total number of loan applications processed in relation to a particular dealership by month and a new loan application for the dealership was just processed and added to the system, causing the total number of processed loan applications for the current month to increase by one, the system 200 may update the stored value of loan applications for the current month to update at the storage device (e.g., the database 218), and the system 200 (e.g., via the automated assistant device 220) may then automatically cause the interactive real-time data displayed in the display window 402 to similarly update. Thus, in this case, if a user is viewing a bar chart showing loan applications by month, the last bar of the bar chat which represents the current month may automatically increase by one unit in response to an update at the storage device. According to some embodiments, the system 200 may automatically update data displayed in the display window 402 in response to long polling performed by the device that displays the display window 402 (e.g., the CSR terminal 222, the user device 202). For example, if a user is viewing the chat user interface 400 on the CSR terminal 222 and the data displayed by the display window 402 is stored by the database 218, then in some embodiments, the CSR terminal 222 may intermittently ping the database 218 for updates in the data. According to some embodiments, the source of the stored data (e.g., the database 218) may intermittently push updates to the display device (e.g., the CSR device 222) that is displaying the data via the display window 402. The ability to provide real-time data via the display window 402 is advantageous because, for example, sales calls are made in real time and having the most up to date data may be the difference between making a sale or not making a sale. For example, in some embodiments, a "bank" metric may be associated with a relationship manager (RM), which may indicate an amount of money that an RM is allocated to spend per month. When a new auto loan application is filed by a dealership, the loan application may have an initial set of terms (e.g., annual percentage rate (APR), fees, etc.), but an RM may have the power to adjust the terms to make the deal more attractive to the dealership, by using allotted funds associated with the "bank" metric. In conventional systems, the "bank" metric may be updated once every 24 hours, which means that RMs are likely making decisions based on old data, which may cause them to be more cautious about adjusting loan terms to make sales, as they may perceive the value of the allotted funds associated with the "bank" metric to be less than it really is, which may cause them to miss a sale. However, because the system 200 can provide an RM with real-time data, the RM will know the displayed value of the "bank" metric is accurate, which may allow the RM to be more aggressive in closing deals by being confident that they will not exceed the amount of funds allotted in association with the "bank" metric.

Figure 10:
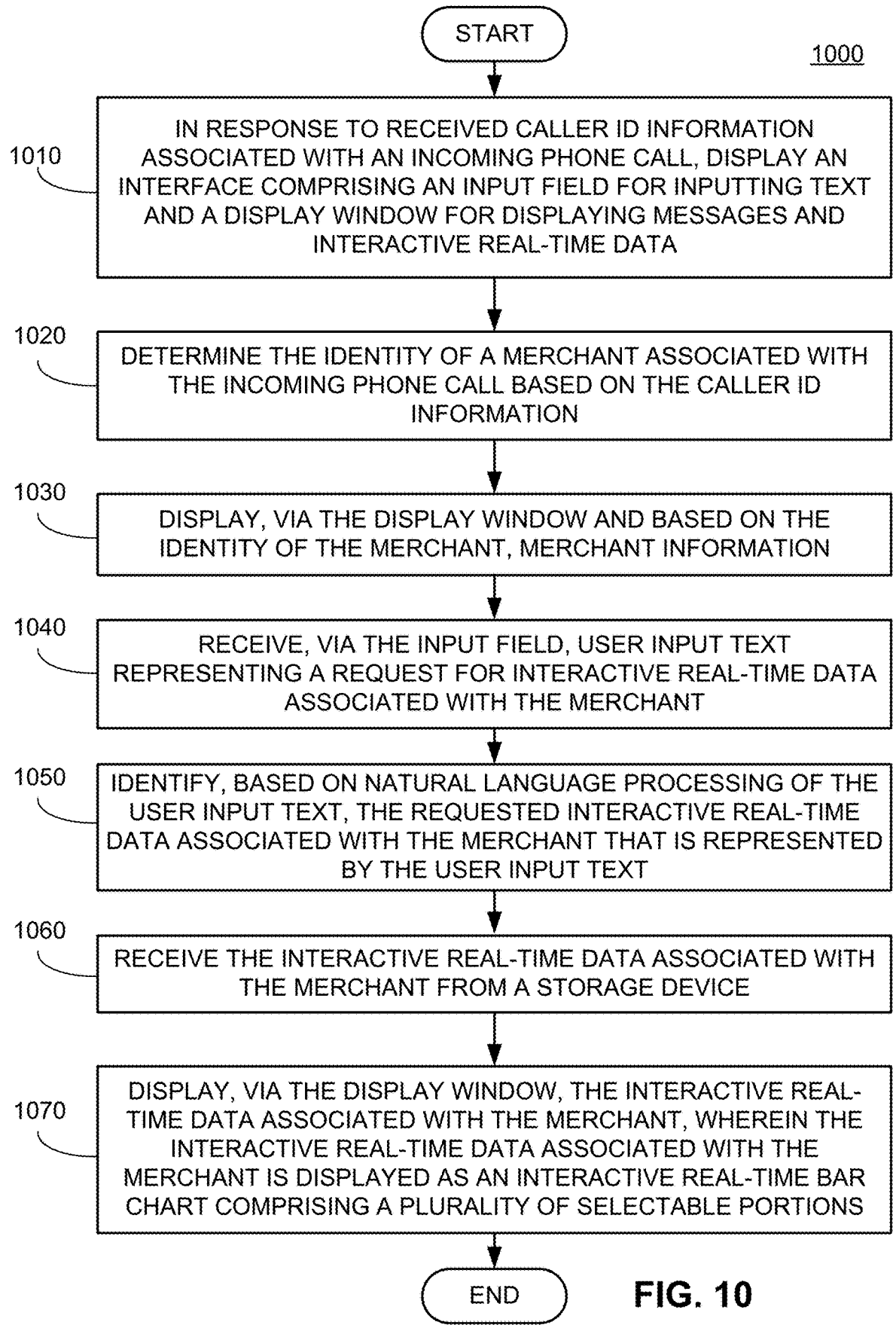
FIG. 10 is a flowchart of another example of a method for providing interactive data via an automated assistant within a chat user interface, in accordance with some examples of the present disclosure.

FIG. 10 shows a flowchart of a method 1000 for providing interactive data in real time via an automated assistant. In some embodiments, the interactive data may be provided within a chat user interface. The method 1000 may be performed by a system including some or all of a web server 210, a call center server 212, a transaction server 214, a database 218, an automated assistant device 220, a CSR terminal 222, an NLP device 224, a user device 202, and a merchant server 226.

In block 1010, the system (e.g., via the call center server 212) may receive caller ID information associated with the incoming phone call. For example, the caller ID information may indicate the number the incoming phone call is originating from, a name of a person associated with the phone number, and/or the number of an organization associated with the incoming phone call.

In block 1020, the system (e.g., via the call center server 212) may determine, based on the caller ID information, the identity of a merchant or customer associated with the incoming phone call.

In block 1030, the system (e.g., via the CSR terminal 222) may display merchant information via the display window 402 based on the identity of the merchant or customer associated with the incoming call. For example, merchant information may include the name, phone number, address, or previous transaction/sales data associated with the merchant or customer that is associated with the incoming call.

In block 1040, the system (e.g., via the CSR terminal 222) may receive, for example via the input field 404, user input text representing a request for interactive real-time data associated with the merchant or customer.

In block 1050, the system (e.g., via the NLP device 224) may identify the requested interactive real-time data associated with the merchant or customer that is represented by the user input text based on natural language processing of the user input text.

In block 1060, the system (e.g., the CSR terminal 222) may receive the interactive real-time data associated with the merchant or customer from a storage device, such as the database 218 for example. In some embodiments, the automated assistant device 220 may retrieve the interactive real-time data associated with the merchant or customer and may transmit the interactive real-time data to the CSR terminal 222.

In block 1070, the system (e.g., the CSR terminal 222) may display the interactive real-time data associated with the merchant or customer via the display window 402. In some embodiments, the interactive real-time data may be displayed as an interactive real-time bar chart comprising a plurality of selectable portions. In some embodiments, the interactive real-time bar chart may include a first selectable portion that is configured to display a pop-up window showing further data when selected. In some embodiments, the interactive real-time bar chart may include a second selectable portion associated with a bar of the interactive real-time bar chart. According to some embodiments, the system may display a detailed interactive real-time bar chart in response to receiving a user input indicating selection of the second selectable portion, such as for example, receiving an indication of a mouse click on the area of the screen of the CSR terminal 222 that includes the second selectable portion. According to some embodiments, the detailed interactive real-time bar chart may comprise multiple bars representative of data represented in aggregate by the bar associated with the second selectable portion. For example, if the bar associated with the second selectable portion represents data for the year 2016, the detailed interactive real-time bar chart may be a chart having multiple bars that represent the months of the year 2016.

According to some embodiments, a method may include receiving a user input indicative of a command to display a more detailed view of a portion of the interactive real-time data. For example, if the interactive real-time data is being displayed via the display window 402 as an interactive real-time chart, the system 200 (e.g., via the automated assistant device 220) may receive a user input indicative of a command to display a more detailed view of a portion of the interactive chart. In some embodiments, a user input indicative of a command may be, for example, a mouse click on a bar of the interactive bar chart displayed via the display window 402, a spoken voice command, a text command input into the input field 404, or any other form of input that may be interpreted as a command by a computing device. In response to the user input, the automated assistant device 220 may receive an indication of the selection of the bar, which represents a portion of the interactive bar chart. In response to receiving the command to display a more detailed view of the portion of the interactive real-time chart, the automated assistant device 220 may cause a more detailed view of the selected portion of the interactive real-time chart to be displayed via the display window 402. For example, the automated assistant device 220 may generate a new more detailed interactive bar chart that depicts, for example, multiple bars representative of the data represented by the selected bar of the original interactive bar chart. For example, if a first interactive bar chart displays bars corresponding to the number of applications by year, a user may select a bar representing a particular year and the system may generate a new chart that shows, for example, bars corresponding to the number of applications for each month of the selected year.

In some embodiments, a method may include receiving second text representing a request for second interactive real-time data of the interactive real-time data, determining an autocomplete suggestion for further text to complete the second text based on the second text, historical data, and the identification of the merchant, and displaying the autocomplete suggestion via the input field 404. In some embodiments, the autocomplete suggestion may be selectable. For example, if a user types "show me to" into the input field 404, the system (e.g., via the automated assistant device 220) may generate an autocomplete suggestion that fills in the remainder of the message to read "show me total applications" which may be selected by the user to indicate an acceptance of the suggestion. In some embodiments, the system may display a plurality of selectable autocomplete suggestions for the user to choose from. In some embodiments, in response to being selected, the system may automatically enter the autocomplete suggestion into the input field 404.

In some embodiments, the system (e.g. via the automated assistant device 220) may automatically suggest data or other information to be displayed to a user of the CSR terminal 222 based on, for example, the identity of the merchant, the interactive real-time data previously displayed via the display window 402 in association with in incoming phone call, and historical data such as the type of data the user has requested in the past (e.g., patterns of requests) and the type of data that has been requested by anyone with respect to a particular merchant that has been identified as the merchant associated with an incoming call. As described above, the automated assistant device 220 may utilize machine learning techniques to determine suggestions of data that a user may find useful to view and may make suggestions based on those determinations. Thus, in some embodiments, a method may include displaying a first system message representing a suggestion to display new interactive real-time data and receiving text representing a response to the suggestion via the input field 404. The text representing a response to the suggestion may be processed by the system (e.g., via the NLP device 224) to understand its meaning and the system may determine that the response indicates the user's acceptance of the suggestion. Based on the determination that the user has accepted the suggestion, the system (e.g., via the automated assistant device 220) may cause the CSR terminal 222 to display the new interactive real-time data via the display window 402. In some embodiments, instead of typing a response, a user may input a response to a suggestion by, for example, clicking on a checkbox or other selectable input presented by the system. For example, the system may display a system message stating, "Would you like to view application data for 2016?" and the user may respond in the affirmative by typing "yes" in the input field 404 or selecting a "yes" checkbox presented by the chat user interface 400 in association with the system message.

In some embodiments, the system 200 may enable users to set up alerts that will trigger upon the occurrence of some condition. Accordingly, in some embodiments, a method may include receiving a user input representative of a request to create an alert associated with the interactive real-time data, wherein the alert is configured to be triggered upon the occurrence of a specific condition. For example, in some embodiments, the chat user interface 400 may provide an alert user interface that enables a user to input the condition(s) that when satisfied will trigger an alert notification to be displayed, for example, via the chat user interface 400. Once an alert has been created, the system (e.g., via the automated assistant device 220) may monitor the interactive real-time data to detect the specified condition(s) and in response to detecting the specified condition(s) may display an indication that the alert has been triggered via for example, the display window 402. In some embodiments, the system may also display interactive real-time data associated with the alert. For example, if a user sets an alert having a specified condition that total loan applications for a specified dealership are greater than 200, then the system may monitor the number of total loan applications associated with the specified dealership and upon detecting that there are more than 200 loan applications, the system may then display a notification that the condition has been met and may optionally automatically display data associated with the alert, such as, for example, a chart showing the number of applications associated with the specified dealership. According to some embodiments, the system 200 may be used to process loan applications, some of which may include "Specialty Funding" applications that may require a different type of processing than other applications (e.g., they may require same day processing). Accordingly, in some embodiments, the system 200 may enable a user to set up an alert associated with a specialty application that indicates a status change in the application so that the user may process the specialty application immediately in response to the status change.

According to some embodiments, the method may further include receiving caller ID information associated with an incoming phone call, determining the identity of a merchant associated with the incoming phone call based on the caller ID information, retrieving merchant information based on the determined identity of the merchant, and transmitting the merchant information to the computing device for display in a manner similar to that previously described above. In some embodiments, the method may further include storing, by the automated assistant device 220 for example, historical data relating to previous interactions the user of the computing device has had with the chat user interface 400, wherein the previous interactions may include types of data that have been previously requested by the user for display by the computing device in relation to a particular merchant or merchant type. In some embodiments, the automated assistant device 220 may generate a recommendation for specific interactive real-time data to display to the user based on the identity of the merchant associated with the incoming phone call and the historical data. The automated assistant device 220 may further transmit the recommendation to the computing device (e.g., the CSR terminal 222), and in response to receiving an indication of acceptance of the recommendation, the automated assistant device 220 may transmit the specific interactive real-time data to the computing device for display. As described above, the automated assistant device 220 may utilize machine learning techniques to determine what data is likely to be requested by a particular user or in relation to a particular merchant and may automatically generate a recommendation that is presented to the user to provide the user with the option to retrieve the recommended data before the user specifically requests it on their own.

In some embodiments, the system may detect one or more oral statements made in association with the incoming phone call via an audio sensor associated with, for example, the call center server 212 or a phone associated with the CSR terminal 222. According to some embodiments, the system may convert the one or more oral statements to written text via a voice-to-text functionality (e.g. via the call center server 220), analyze the written text using natural language processing techniques to determine the substance of the conversation (e.g. via the NLP device 224), and display a recommendation for new interactive real-time data to display via the display window 402 based on the identification of the merchant or customer and the determined substance of the conversation. According to some embodiments, the recommendation may be displayed via an electronic display associated with the CSR terminal 222. In some embodiments, the automated assistant device 220 may generate the recommendation based on the determined substance of the conversation. For example, if the system (e.g., the call center server 212) determines that a customer on the incoming phone call says "how many applications did you do for us last year?", the system (e.g., the NLP device 224) may determine that the customer is requesting information regarding the number of loan applications the entity associated with the organization 208 processed or issued for the customer in the previous year, and may generate an instruction to the automated assistant device 220 to retrieve that data. The automated assistant device 220 may retrieve the requested data from a storage device and transmit the data to the CSR terminal 222 as interactive real-time data for display. In this way, the system 200 may automatically present interactive real-time data to a salesperson that is relevant to the sales call, without the salesperson having to request it.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not limitation. A financial service provider may compete with other financial service providers to provide loans to individuals who purchase vehicles from car dealerships. To facilitate the loan, a car dealership may call the financial service provider to discuss terms of the loan, and even to call numerous financial service providers to find the best deal. Upon receiving such a call, the automated system (e.g., via the call center server 212) may determine the identity of the car dealership associated with the incoming call and may automatically display information associated with the car dealership on a salesperson's computer (e.g., via the CSR terminal 222). The system may then display a chat user interface to the salesperson that allows the salesperson to input requests for information (e.g., via the CSR terminal 222). The salesperson may type "show total applications," for example, to request to see the total number of loan applications the financial service provider has outstanding with the car dealership.

The system (e.g., via the NLP device 224) may process the text input by the salesperson using multiple named entity recognition models to apply pseudo labels to the text input in an attempt to understand the nature of the request. If the models agree on the labels and entities, the system (e.g., via the NLP device 224) can then store the text with the labels (e.g., via the database 218) as a labeled data set. The system can then display (e.g., via the CSR terminal 222) the requested information within a display window of the chat user interface. If the models do not agree on the labels and entities, the system (e.g., via the NLP device 224) can provide the text input and pseudo labels to a reviewer to correct the pseudo labels. The system (e.g., via the NLP device 224) can then store the text with labels (e.g., via the database 218) as a labeled data set and then may display (e.g., via the CSR terminal 222) the requested information within a display window of the chat user interface.

The system (e.g., via the NLP device 224) can continually refine the named entity recognition models and create new named entity recognition models using the ever-increasing labeled data set to improve the performance of the models. The system (e.g., via the automated assistant device 220) may also use machine learning techniques to understand and predict what information a particular salesperson may request or find useful to aid in responding to requests or to even provide information proactively without being prompted by the user. The information may be displayed as an interactive chart or table that may allow the user to quickly manipulate the view of the data to see, for example, data at a higher or lower level of abstraction or view related data. The system may enable the salesperson to click on a bar in a bar chart (e.g., via the CSR terminal 222), for example, to indicate that the user wants to "drill down" on the data, causing the system to generate (e.g., via the automated assistant device 220) and display a new chart that shows the data of the bar of the bar chart in more granular detail. If a bar in a first bar chart shows the total number of loan applications in a particular year, for example, in response to the salesperson clicking on the bar, the system (e.g., via the automated assistant device 220) may generate and display a new, more detailed, bar chart that shows the number of applications broken down by month.

The system (e.g., via the automated assistant device 220) may include a number of predetermined or customizable actions or commands that allow a user to interact with, manipulate, or change the view of displayed data and/or cause related data to be displayed. The system may further enable the salesperson to modify the data via the chat user interface, which may also update the source data (e.g., at the database 218). If a relationship manager decides to restructure a loan application displayed in the display window of the chat user interface to provide a better deal to a customer by giving an exception or reducing the APR on the deal, for example, the relationship manager may edit the terms of the application displayed in the display window by inputting a change to data via the display device (e.g., via the CSR terminal 222) by clicking, typing, speaking commands, or any other such user input. In response to modifying the terms of the application displayed in the display window, the system (e.g., via the automated assistant 220) may automatically update the stored record (e.g., at the database 218) of the application to reflect the changes, and may also automatically update any associated metrics (e.g., bank spend or proxy profit), so that all users of the system have accurate metrics in real time. In this way, the system may enable a salesperson to quickly view and interact with data related to a particular car dealership, so that the salesperson will have pertinent, up-to-date data at their fingertips to assist them with closing a loan with the car dealership.

What is claimed is:

1. A system for providing natural language processing and interactive responses, the system comprising: one or more processors;
   a display for providing a user interface (UI), the UI comprising:
   an input field for receiving an input by a user; and
   a display window for displaying the user input and one or more responses;
   a natural language processing (NLP) device comprising two or more trained named entity recognition models; and
   a memory in communication with at least the one or more processors, the display, and the NLP device, the memory storing instructions that, when executed by the one or more processors, are configured to cause the one or more processors to:
   receive, via the input field, a first input comprising a first natural language request;
   provide, to the NLP device, the first input; process, using the two or more trained named entity recognition models, the first input to apply pseudo labels to named entities in the first input;
   receive, from each of the two or more trained entity recognition models, a response, each response comprising two or more named entities identified in the first input with corresponding pseudo labels;
   determine, that the responses from the two or more trained named entity recognition models do not match store, in the memory, the user input and the two or more responses in an entry in an exceptions file;
   determine that the exceptions file includes at least one entry;
   display, on the user interface, a notification to a reviewer to review the exceptions file;
   provide, to the reviewer via the UI, the exceptions file;
   receive, via the UI, a corrected response from the reviewer;

store, in the memory, the corrected response in a training data set; and train a first named entity recognition model using the training data set.

2. The system of claim 1, wherein the instructions further cause the one or more processors to:

retrieve, from the memory, the training data set comprising corrected responses provided by the reviewer in reviewing the exceptions file;

train a second named entity recognition model, using the training data set, to apply pseudo labels to the first input when the two or more responses do not match; and store, in the memory, the second named entity recognition model.

3. The system of claim 2, wherein the second named entity recognition model is added to the two or more named entity recognition models.

4. The system of claim 1, wherein the determining comprises:

receiving a confidence level for each of the two or more responses from each respective model of the two or more trained named entity recognition models;

averaging a value of the confidence levels; and determining that the average value is less than a predetermined threshold value.

5. The system of claim 1, wherein the instructions further cause the one or more processors to:

provide the first input and the two or more responses to a different trained named entity recognition model that is separate from the two or more trained named entity recognition models; and receive, from the different trained named entity recognition model, a corrected response to the request.

6. A system for providing natural language processing and interactive responses, the system comprising:

a display comprising a user interface (UI), the UI including an input field for receiving input from a user;

one or more processors a natural language processing (NLP) device comprising two or more trained named entity recognition models; and a memory in communication with at least the one or more processors, the display, and the NLP device, the memory storing instructions that, when executed by the one or more processors, are configured to cause the system to:

train a first named entity recognition model using a training data set, the training data set comprising previous natural language requests labeled by the two or more trained named entity recognition models; add the first named entity recognition model to the two or more trained named entity recognition models;

receive, via the input field, a first input comprising a first natural language request; provide, to the NLP device, the first input; process, using the two or more trained named entity recognition models, the first input to apply pseudo labels to named entities in the first input;

receive, from each of the two or more trained named entity recognition models, a response, each response comprising two or more named entities with corresponding pseudo labels;

determine, with the one or more processors, that the two or more responses do not match;

store, in the memory, the first input and the two or more responses in an entry in an exceptions file;

determine that the exceptions file includes at least one entry;

display, on the user interface, a notification to a reviewer to review the exceptions file;

provide, to the reviewer via the UI, the exceptions file;

receive, via the UI, a corrected response from the reviewer;

store, the memory, the corrected response in a training data set; and train a second named entity recognition model using the training data set.

7. The system of claim 6, the UI further comprising: a display window for displaying the first input and one or more responses.

8. The system of claim 6, wherein the determining comprises:

receiving a confidence level for the two or more responses from each respective model of the two or more trained named entity recognition models;

averaging a value of the confidence levels; and determining that the average value is less than a predetermined threshold value.

9. The system of claim 6, wherein the instructions further cause the one or more processors to:

determine that the exceptions file includes at least one entry;

provide the request and the two or more responses to a different trained named entity recognition model that is separate from the two or more trained named entity recognition models; and receive, from the different trained named entity recognition model, a corrected response to the request.

10. The system of claim 9, wherein the instructions further cause the one or more processors to:

store, in the memory, the corrected response in the training data set; and train the second named entity recognition model using the training data set.

11. A system for providing natural language processing and interactive responses, the system comprising:

one or more processors; a display for providing a user interface (UI), the UI comprising:

an input field for receiving an input by a user; and a display window for displaying the user input and one of more responses;

a natural language processing (NLP) device comprising two or more trained named entity recognition models; and a memory in communication with at least the one or more processors, the display, and the NLP device, the memory storing instructions that, when executed by the one or more processors, are configured to cause the system to:

receive, via the input field, a first input comprising a first natural language request;

provide, to the NLP device, the first input;

process, using the two or more trained named entity recognition models, the first input to apply pseudo labels to named entities in the first input;

receive, from each of the two of more trained entity recognition models, a response, each response comprising two or more named entities with corresponding pseudo labels;

determine, that the two or more responses do not match;

store, in the memory, the user input and the two or more responses in an entry in an exceptions file;

display, on the user interface, a notification to a reviewer to review the exceptions file;

provide, to the user via the UI, the exceptions file;

receive, via the UI, a corrected response from the user;

store, the memory, the corrected response in a new training data set;
retrieve, from the memory, the new training data set;
train a new trained entity recognition model using the new training data set; and
store, in the memory, the new trained entity recognition model.

12. The system of claim 11, wherein the instructions further cause the one or more processors to:
provide the request and the two or more responses to a different trained named entity recognition model that is separate from the two or more trained named entity recognition models; and
receive, from the different trained named entity recognition model, a corrected response to the request.

13. The system of claim 11, further comprising an audio sensor.

14. The system of claim 13, wherein the instructions further cause the one or more processors to:
receive a spoken word request via the audio sensor;
process the spoken word request to obtain an audio natural language request; and
wherein the first natural language request comprises the audio natural language request.

15. The system of claim 11, wherein the determining comprises:
receiving a confidence level for each of the responses from the two or more trained named entity recognition models;
averaging the confidence levels; and
determining that the average is less than a predetermined threshold value.

* * * * *